United States Patent
S et al.

(10) Patent No.: US 11,411,666 B2
(45) Date of Patent: Aug. 9, 2022

(54) CLOCK FAULT DETECTION AND CORRECTION BETWEEN SYNCHRONIZED NETWORK DEVICES

(71) Applicant: Juniper Networks, Inc., Sunnyvale, CA (US)

(72) Inventors: Satheesh Kumar S, Bangalore (IN); Kamatchi S. Gopalakrishnan, Dublin, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 69 days.

(21) Appl. No.: 16/918,684

(22) Filed: Jul. 1, 2020

(65) Prior Publication Data

US 2021/0367693 A1    Nov. 25, 2021

(30) Foreign Application Priority Data

May 19, 2020    (IN) .............................. 202041021034

(51) Int. Cl.
*H04L 7/033*    (2006.01)
*H04J 3/06*    (2006.01)

(52) U.S. Cl.
CPC .......... *H04J 3/0641* (2013.01); *H04J 3/0647* (2013.01); *H04J 3/0679* (2013.01); *H04J 3/0697* (2013.01); *H04L 7/033* (2013.01)

(58) Field of Classification Search
CPC ...... H04J 3/0641; H04J 3/0647; H04J 3/0679; H04J 3/0697; H04L 7/033
See application file for complete search history.

(56) References Cited

U.S. PATENT DOCUMENTS

| 5,903,748 A * | 5/1999 | McCollough | G06F 1/08 714/47.1 |
| 5,946,362 A * | 8/1999 | Ha | H04J 3/0688 375/357 |
| 5,955,959 A * | 9/1999 | Taki | H04J 3/1611 375/357 |
| 6,041,066 A * | 3/2000 | Meki | H04J 3/08 370/512 |

(Continued)

OTHER PUBLICATIONS

Extended European Search Report for Application No. EP20192077.4, dated Feb. 12, 2021, 10 pages.

(Continued)

*Primary Examiner* — Alpus Hsu
(74) *Attorney, Agent, or Firm* — Harrity & Harrity, LLP

(57) ABSTRACT

A first network device may receive, from a second network device, a clock quality indication that is associated with a clock of the second network device, wherein the clock of the second network device is a reference clock for a network that includes the first network device and the second network device. The first network device may determine, based on a clock signal of the second network device, that a quality metric of the clock does not satisfy a threshold. The first network device may provide, to the second network device, a clock fault notification to cause the second network device to downgrade the clock quality indication transmitted by the second network device. The first network device may select a new reference clock for the first network device based on receiving the downgraded clock quality indication from the second network device.

20 Claims, 16 Drawing Sheets

(56) References Cited

U.S. PATENT DOCUMENTS

| | | | | |
|---|---|---|---|---|
| 6,236,665 | B1* | 5/2001 | Kanzaki | H04J 3/0688 |
| | | | | 370/503 |
| 6,618,455 | B1 | 9/2003 | Maeda et al. | |
| 7,924,061 | B2* | 4/2011 | Guillot | G06F 1/24 |
| | | | | 327/20 |
| 8,149,881 | B2* | 4/2012 | Wong | H04J 3/0641 |
| | | | | 370/503 |
| 8,630,315 | B2* | 1/2014 | Rivaud | H04L 12/413 |
| | | | | 370/509 |
| 8,913,633 | B2* | 12/2014 | Obradovic | H04J 3/0697 |
| | | | | 370/503 |
| 9,264,212 | B2* | 2/2016 | Le Pallec | H04J 3/065 |
| 9,641,268 | B2* | 5/2017 | Li | H04J 3/0641 |
| 9,998,247 | B1* | 6/2018 | Choudhury | H04J 3/0685 |
| 10,908,635 | B1* | 2/2021 | Ranganathan | H03L 7/22 |
| 2017/0078985 | A1 | 3/2017 | Zheng et al. | |
| 2020/0322906 | A1* | 10/2020 | Lv | H04J 3/0658 |

OTHER PUBLICATIONS

Mayer M., et al., "G. 8264: Amd 2 Latest draft; TD542/WP3", Huawei Technologies, International Telecommunication Union, vol. 13/15, Jan. 21, 2020, pp. 1-36, XP044280545, Retrieved from the internet [URL: https://www.itfu.int/ifa/t/2017/sg15/docs/200127/td/ties/wp3/T17-SG15-200127-TD-WP3-0542IIMSW-E.docx].

Stefano Ruffini Ericsson Italy "Sync OAM requirements; TD 471 Rev.1 WP (3/15)", International Telecommunication Union, vol. (10/15, 13/15, 14/15), Feb. 18, 2016, pp. 1-11, XP044166010.

* cited by examiner

300

Table 1
Modified TLV type used for Fault Notification

| QL-TLV | |
|---|---|
| 8 bits | Type: 0x01 |
| 16 bits | Length: 0x0004 |
| 4 bits | 0x0 (unused) |
| 4 bits | SSM code |

| Fault Code | Fault |
|---|---|
| 0000 | Default/ No Fault |
| 0001 | Clock Fault |

Table 2
New TLV Type used for Fault Notification

| QL-TLV | |
|---|---|
| 8 bit | Type: 0x03 |
| 16 bits | Length: 0x0004 |
| 4 bits | Fault code |
| 4 bits | reserved |

| Fault Code | Fault |
|---|---|
| 0000 | Default/ No Fault |
| 0001 | Clock Fault |

FIG. 3

CLOCK FAULT DETECTION AND CORRECTION BETWEEN SYNCHRONIZED NETWORK DEVICES

CROSS-REFERENCE TO RELATED APPLICATION

This application claims priority to Indian Provisional Application No. 202041021034 entitled "CLOCK FAULT DETECTION AND CORRECTION BETWEEN SYNCHRONIZED NETWORK DEVICES," filed on May 19, 2020. The entire content of which is expressly incorporated herein by reference.

BACKGROUND

In some networks, timing may be critical for telecommunication system performance. For example, in some networks, synchronized clocks may be required at both source and destination nodes. Synchronized networks, such as synchronous ethernet networks, facilitate the transference of clock signals over a physical layer to provide a synchronization signal to those network resources that may eventually require synchronization.

SUMMARY

According to some implementations, a method may include receiving, by a first network device and from a second network device, a clock quality indication that is associated with a clock of the second network device, wherein the clock of the second network device is a reference clock for a network that includes the first network device and the second network device; determining, by the first network device and based on a clock signal of the second network device, that a quality metric of the clock does not satisfy a threshold; providing, by the first network device and to the second network device, a clock fault notification to cause the second network device to downgrade the clock quality indication transmitted by the second network device; selecting, by the first network device, a new reference clock for the first network device based on receiving the downgraded clock quality indication from the second network device.

According to some implementations, a first network device may include one or more memories and one or more processors. In some implementations, the one or more processors are communicatively coupled to the one or more memories. The one or more processors may be configured to: measure a quality metric of a clock signal, wherein the clock signal is associated with a clock of a second network device, and wherein the clock of the second network device is a reference clock for the first network device and the second network device; determine, based on the clock signal, that the quality metric does not satisfy a threshold value; provide, based on the threshold value not being satisfied, a clock fault notification to the second network device to cause the second network device to downgrade a clock quality indication transmitted by the second network device; and perform an action associated with establishing a new reference clock for the first network device.

According to some implementations, a system may include a first network device, configured to: receive a clock quality indication that is associated with a clock of a second network device, wherein the clock of the second network device is a reference clock for a network that includes the first network device and the second network device; determine, based on a clock signal of the second network device, that a quality metric of the clock does not satisfy a threshold value; and provide, to the second network device, a clock fault notification to cause the second network device to downgrade the clock quality indication.

BRIEF DESCRIPTION OF THE DRAWINGS

FIG. 3 are diagrams of one or more example clock fault notification configurations described herein.

DETAILED DESCRIPTION

Figure 1A:
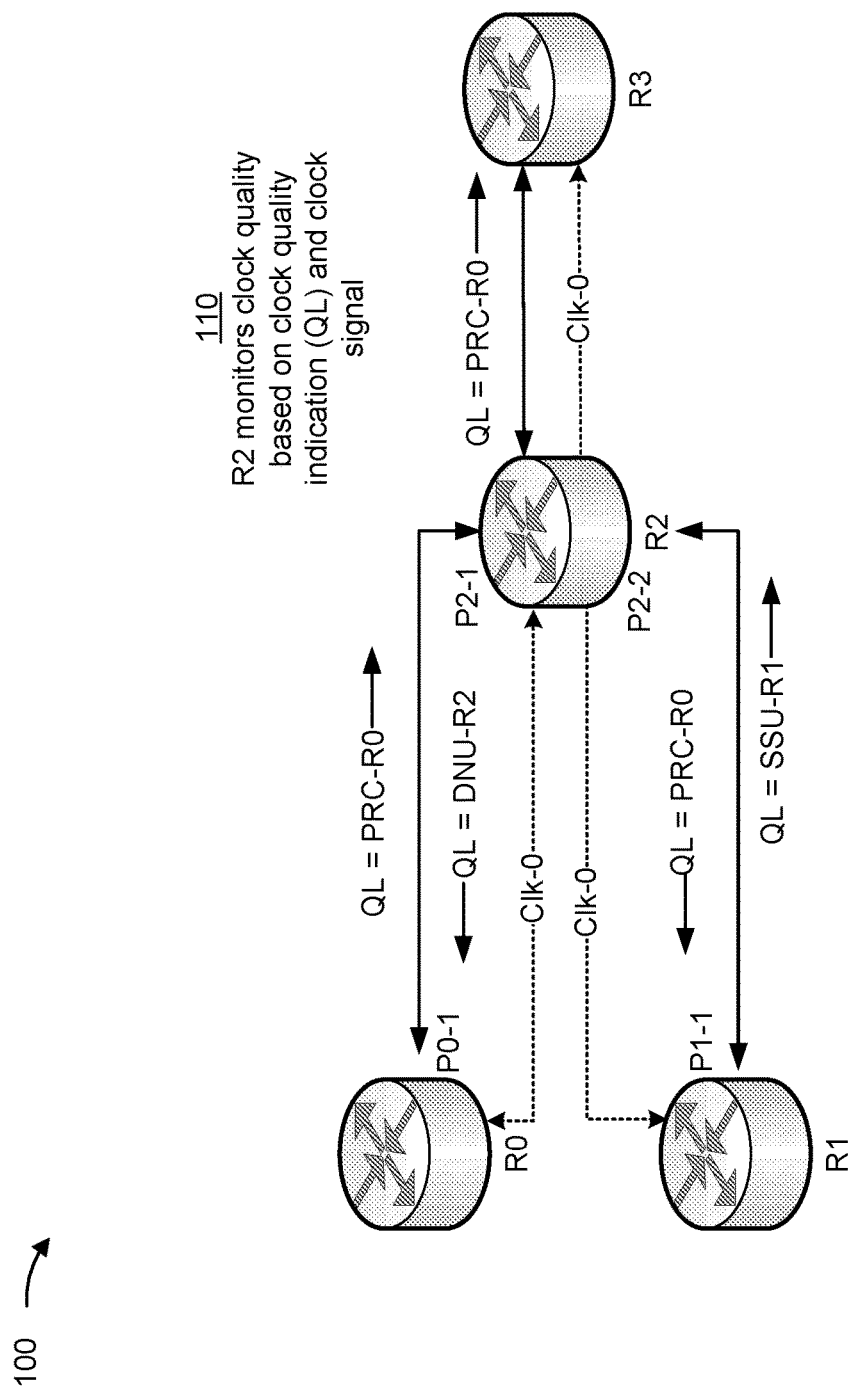
FIGS. 1A-1F are diagrams of an example implementation described herein.

The following detailed description of example implementations refers to the accompanying drawings. The same reference numbers in different drawings may identify the same or similar elements.

In a synchronous network, such as a synchronous Ethernet network, network devices may synchronize by sharing clock signals over a physical layer. The network devices may transmit an indication of the quality of the clock signal via packets to each network device. For example, a first network device may receive a first physical clock signal and an indication of the quality of the first clock signal via packets from a second network device. The first network device may receive a second physical clock signal and an indication of the quality of the second clock signal via packets from a third network device. The first network device may determine that the clock signal from the second network device should serve as a reference clock for the network (e.g., based on comparing the indication of the quality of the clock signals from the second network device and the third network device).

The first network device may provide the clock signal of the second network device to the third network device and indicate to the third network device that the clock signal of the second network device is to be used to synchronize the first network device, the second network device, and the third network device. However, if a clock signal of a network device fails (e.g., due to an error of the network device, a deterioration of hardware of the network device, a bad port, a bad line card, and/or the like) the network device may continue to transmit an indication of the quality of the clock signal through packet that does not reflect the actual quality of the physical clock signal (e.g., the network device may continue to transmit an indication that the clock signal is a high quality when the actual quality of the clock signal is poor). Another network device (e.g., the first network device) may receive the indication of the quality of the clock signal (e.g., indicating a high quality clock signal) and select the clock signal as the reference clock based on the indication of the quality of the clock signal. As a result, a poor physical clock signal (e.g., due to the clock signal of the reference clock failing) may be selected and transmitted to other network devices of the network and used to synchronize the network devices. Moreover, using a poor clock signal to synchronize the network devices of the synchronous network may degrade performance and reliability of communications sent over the synchronous network by the network devices.

Some implementations described herein enable clock fault detection and correction between synchronized network devices. For example, a first network device may be configured to compare a quality metric of a physical clock signal received from another network device to a threshold. The first network device may determine that the clock of the other network device has failed based on determining that the quality metric of the clock signal does not satisfy the threshold. The first network device may send a clock fault notification to the other network device to cause the other network device to downgrade the clock quality indication transmitted via packets by the other network device. The first network device may select a different clock signal as the reference clock for the synchronous network based on receiving the downgraded clock quality indication from the other network device. As a result, the synchronous network will not use a poor clock signal to synchronize the network devices of the synchronous network. This may conserve computing resources and/or network resources that would have otherwise been used synchronizing the network devices of the synchronous network using a poor clock signal. Moreover, ensuring that a poor clock signal is not used to synchronize the network devices of the synchronous network may improve performance and reliability of communications sent over the synchronous network by the network devices.

FIGS. 1A-1E are diagrams of an example implementation 100 described herein. As shown in FIGS. 1A-1E, example implementation 100 includes multiple network devices (e.g., R0, R1, R2, and R3) within a synchronous network. R2 may be a first network device, R0 may be a second network device, R1 may be a third network device, and R3 may be a fourth network device. Within a topology of the synchronous network, R2 may be situated between R0 and R1 and R3 (e.g., R0 and R1 may be upstream from R2 in the synchronous network topology (e.g., before R2 in the synchronous network topology), and R3 may be downstream from R2 in the synchronous network topology (e.g., after R2 in the synchronous network topology)). In some implementations, R0, R1, and/or R2 may be router devices, switch devices, server devices, wireless nodes, and/or the like.

The network devices (e.g., R0, R1, R2, R3, and/or the like) may transmit clock signals at a physical layer of the network. The network devices may synchronize (e.g., based on the clock signals and clock quality indications associated with the clock signals coming over packets) internal clocks using a selected reference clock (e.g., from the clocks of the network devices of the synchronous network) to form a chain or tree of interconnected Ethernet equipment clocks (EECs). The EECs may be based on a primary reference clock (PRC) (e.g., the source of the EECs may be traced to a PRC which may be the selected reference clock). The synchronous network may be a synchronous Ethernet network that uses a synchronous Ethernet protocol to synchronize network devices within the synchronous network (e.g., using a reference clock of the synchronous network).

As shown in FIG. 1A, and by reference number 110, R2 may monitor clock quality of one or more clocks of the synchronous network based on clock quality indications (e.g., QL, as shown in FIGS. 1A-1E) and clock signals received from other network devices of the synchronous network (e.g., R0, R1, and/or the like). Clock quality indications may indicate a quality of the clock signal that is sent by the network device. Clock quality indications may indicate that the clock signal is associated with a primary reference clock (e.g., PRC), that the clock signal is associated with a synchronization supply unit (e.g., SSU), that the clock signal is associated with a synchronous digital hierarchy (SDH) equipment clock (e.g., SEC), that the clock signal should not be used (e.g., DNU), and/or the like. The clock quality indications may be prioritized, such that a network device that receives the clock quality indications may select a clock signal as a reference clock for the synchronous network based on the priority of the clock quality indications. For example, the clock quality indications may be prioritized such that an indication of PRC has the highest priority, followed by an indication of SSU, followed by an indication of SEC as per ITU-T standard G.8264. In some implementations, the indication of SSU may include a higher priority SSU (e.g., SSU-A) and a lower priority SSU (e.g., SSU-B). In some implementations, a network device will select the clock signal associated with the highest priority clock quality indication to be the reference clock for the synchronous network.

The clock quality indications may be transmitted via an Ethernet communication layer of the synchronous network (e.g., indicated by the solid lines in FIGS. 1A-1E). The Ethernet communication layer may be an Ethernet synchronization message channel of the network. For example, the clock quality indications may be sent within a packet, using packet-based communication, using an Ethernet synchronous messaging channel (ESMC), and/or the like. The clock quality indications may be included within a synchronization status message (SSM), may be sent as an SSM, and/or the like. The clock quality indications may be indicated in a type-length-value (TLV) field of an SSM. For example, an SSM may include a TLV field that includes a value. The value may indicate the clock quality indication (e.g., PRC, SSU, SEC, DNU, and/or the like).

The clock signals may be transmitted via a physical layer of the synchronous network (e.g., indicated by the dotted lines in FIGS. 1A-1E). The clock signals may be a frequency generated by the network devices (e.g., by a clock module of the network device). The clock signals may be received via a phase-locked loop (PLL) of a network device. The clock signals may be associated with one or more quality metrics, such as a frequency error rate, a frequency accuracy level, frequency drift, a noise transfer level, a noise generation level, a holdover performance level, and/or the like. The quality metric may be measured in parts per million (ppm). The quality metric may indicate a quality level (e.g., good quality, poor quality, and/or the like) of the clock signal. A network device may measure or determine the quality metric via the PLL of the network device.

As shown in FIG. 1A, R2 may receive a clock signal (e.g., Clk-0) and an associated clock quality indication (e.g., PRC) from R0. R2 may receive the clock signal via the PLL associated with R2. R2 may receive the clock quality indication via a first port of R2 (e.g., P2-1). R2 may determine that the clock signal of R0 should be selected as the reference clock for the synchronous network based on a best master clock algorithm (BMCA). The BMCA may compare the clock quality indication received from of R2 to a clock quality indication received from one or more other network devices (e.g., R1 and/or the like) to validate inputs, compare clock quality indications, select a reference clock, and/or the like. For example, R2 may determine that the clock signal of R0 should be selected as the reference clock for the synchronous network based on the clock quality indication received from R0. In this case, R0 may transmit an indication that the clock quality of the clock signal is PRC (e.g., indicating that the clock signal sent by R0 is associated with a PRC for the synchronous network, that the clock signal sent by R0 is high quality, that the clock signal sent by R0 is associated with the highest priority, and/or the like). R1 may transmit a clock quality indication of the clock signal of R1 of SSU (e.g., SSU-A, SSU-B, and/or the like). R2 may compare the clock quality indication received from R0 (e.g., PRC) to the clock quality indication received from R1 (e.g., SSU). R2 may select the clock signal of R0 as the reference clock based on the clock quality indication received from R0 having a higher priority than the clock quality indication received from R1.

In some implementations, the clock signal (e.g., Clk-0) may be a clock signal generated by R0. In some implementations, R0 may receive a clock signal from a network device upstream from R0 (not shown in FIG. 1A). R0 may determine that the clock signal from the network device upstream from R0 should be selected as the reference clock (e.g., based on a clock quality indication associated with the clock signal from the network device upstream from R0 and using the BMCA, as described above). R0 may generate a clock signal (e.g., Clk-0) that is the same as (e.g., matches) the clock signal received from the network device upstream from R0. R0 may transmit this clock signal, along with a clock quality indication of PRC, to R2 and/or other network devices downstream of R0.

In some implementations, R2 may transmit a clock signal and a clock quality indication to R0. In this case, as R2 has determined that the clock signal of R0 should be selected as the reference clock for the synchronous network, R2 may transmit a clock quality indication of DNU to R0 (e.g., indicating that R0 should continue to use Clk-0 as the reference clock and R0 should not select the physical clock sent by R2 to R0).

R2 may generate a clock signal (e.g., Clk-0) that is the same as the clock signal received from R0, based on determining that the clock signal of R0 should be selected as the reference clock for the synchronous network. R2 may transmit the clock signal Clk-0 and a clock quality indication of PRC to R1. The clock quality indication transmitted by R2 to R1 may indicate to R1 that the clock signal transmitted by R2 should be used as the reference clock for the synchronous network. As a result, R1 may determine that the clock signal transmitted by R2 should be selected as the reference clock for the synchronous network (e.g., using the BMCA in a similar manner as described above). R1 may generate a clock signal (e.g., Clk-0) that is the same as the clock signal received from R2 and transmit the clock signal, along with a clock quality indication of PRC, to other network devices downstream from R1.

Similarly, R2 may transmit a clock signal (e.g., Clk-0) and an associated clock quality indication (e.g., PRC) to one or more downstream network devices, such as R3. This may cause the downstream network devices to select the clock signal (e.g., Clk-0) transmitted by R2 as the reference clock.

In some implementations, the clock signal, Clk-0, transmitted by R0 may be a poor quality clock signal. For example, due to a failure associated with R0, the clock signal generated by R0 may have a high frequency error rate (e.g.,  4.1 ppm and/or the like). In some implementations, the high frequency error rate may be based on a failure associated with R0. The failure may be a transmission failure (e.g., based on a failure of a port of R0, a failure of a line card of R0, failure of optics module used at R0, and/or the like), a hardware failure associated with generating the clock signal, and/or the like. In some implementations, the high frequency error rate may be based on a failure associated with a network device upstream from R0 (e.g., that transmitted a clock signal to R0). However, R0 may not detect the high frequency error rate as R0 may only select a reference clock and match the clock of R0 to the selected reference clock. In some implementations, R0 may not detect the transmission failure associated with sending the clock signal (e.g., as internal hardware of R0 generating the clock signal may not be failing). As a result, R0 may transmit a clock signal with a high frequency error rate to R2 while indicating (e.g., via the clock quality indication) that the clock signal is associated with a high quality (e.g., 0 ppm frequency error rate and/or the like) clock signal. This may cause R2 to select the clock signal transmitted by R0 and drive the clock signal with a high frequency error rate to R1, and/or other downstream network devices (e.g., R3 and/or the like), while indicating (e.g., via the clock quality indication) that the clock signal is associated with a high quality clock signal.

Figure 1B:
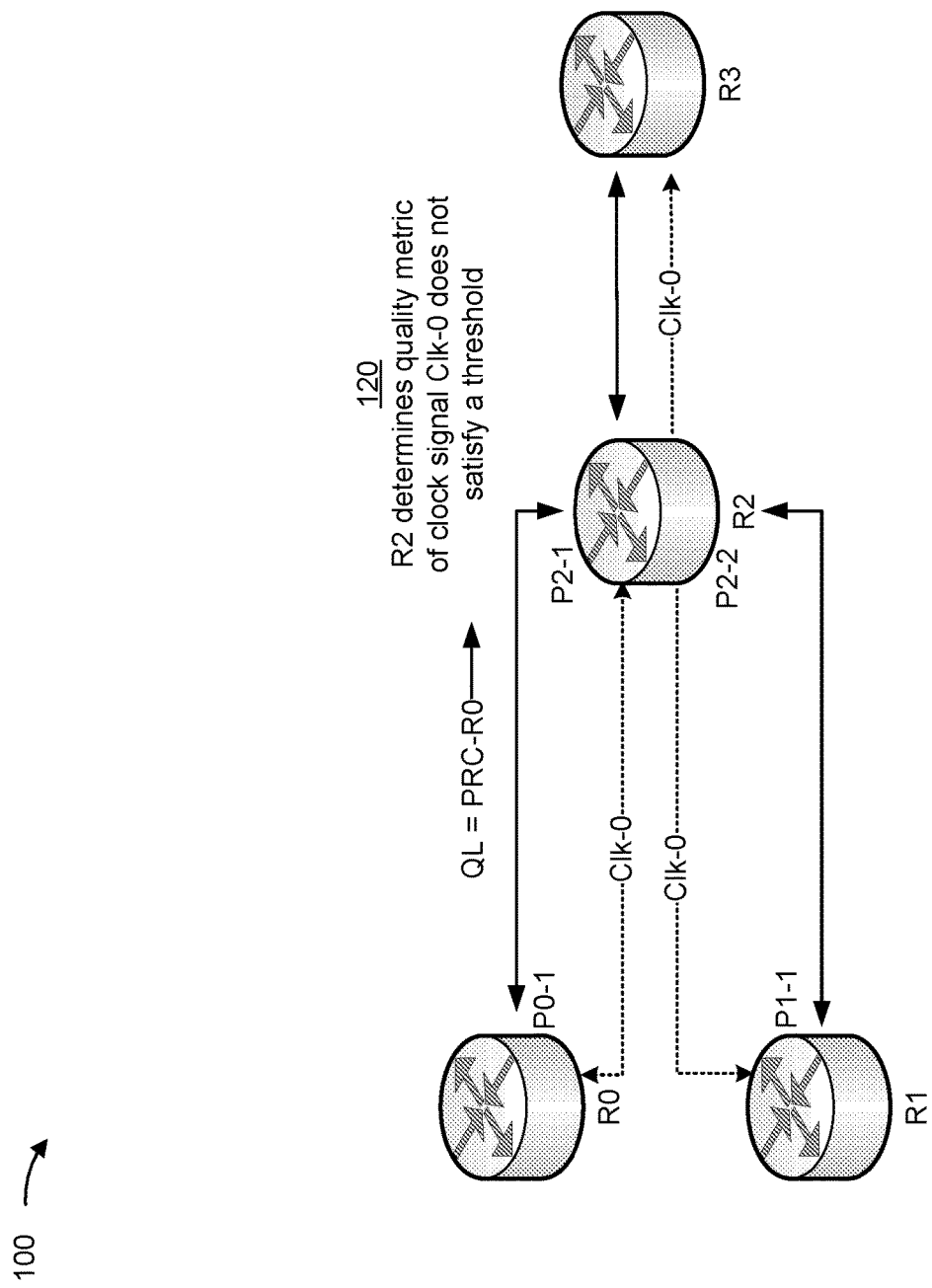

As shown in FIG. 1B, and by reference number 120, R2 may determine that a quality metric of the clock signal received from R0 does not satisfy a threshold (e.g., not satisfy a threshold value, not within a threshold range, and/or the like). As described above, R0 may indicate in the clock quality indication (via SSM packets) that the clock quality of the clock signal transmitted by R0 is PRC (e.g., indicating that the clock signal of R0 should be used as the reference clock for the synchronous network). For example, R2 may be configured with one or more threshold quality metrics (e.g., frequency error rate, frequency accuracy, and/or the like). The threshold quality metric may indicate that the quality metric of a physical clock signal must satisfy a value (e.g., in ppm), must be within a range of values, and/or the like.

R2 may determine a quality metric associated with the clock signal received from R0. For example, R2 may analyze or measure the clock signal received from R0 to determine the quality metric. R2 may determine or measure the quality metric of the clock signal of R0 via the PLL (or similar) of R2 (e.g., R2 may input the clock signal of R0 into the PLL of R2 to measure or determine the quality metric). As a result, R2 may determine that an error has occurred associated with the clock signal received from R0 (e.g., a clock fault) based on the quality metric of the clock signal received from R0 not satisfying a threshold value.

Figure 1C:
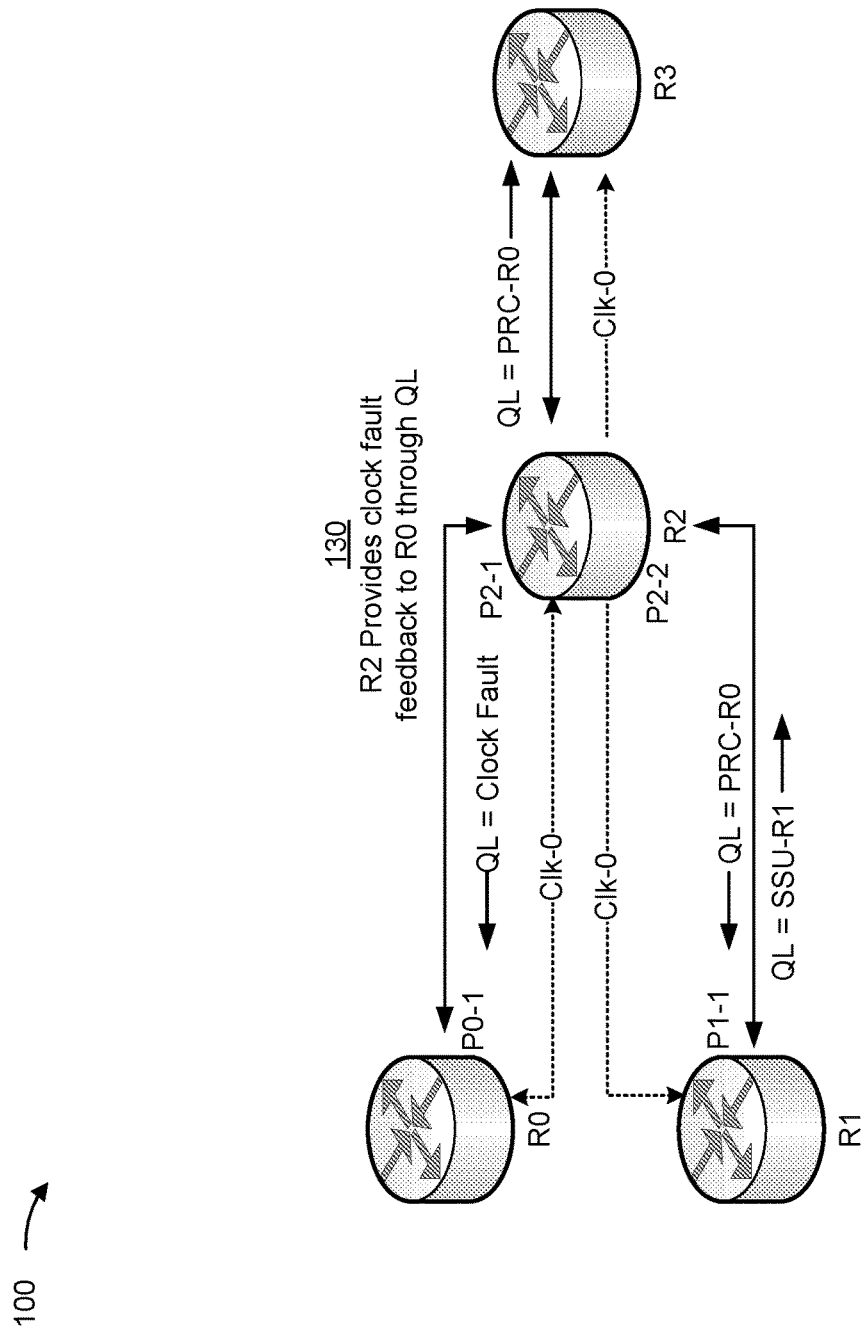

As shown in FIG. 1C, and by reference number 130, R2 may provide clock fault feedback to R0 using the clock quality indication provided to R0 (e.g., as described above with respect to FIG. 1A). For example, R2 may provide a clock fault notification via SSM packet to R0 to notify R0 that the clock signal being transmitted from R0 to R2 is poor (e.g., a quality metric of the clock signal does not satisfy the threshold value, as described above). During this time, R2 may continue to use the clock signal from R0 as the reference clock as the clock quality indication received from R0 has not changed (e.g., the clock quality indication transmitted by R0 is still PRC).

The clock fault notification may be an indication in a TLV field of an SSM transmitted to R0. In some implementations, the SSM may be the same type of SSM used to transmit the clock quality indication (e.g., if R0 is an updated or enhanced network device, as described below with respect to FIG. 3). In some implementation, the SSM may be a different type of SSM (e.g., if R0 is not configured to detect the clock fault notification in the SSM). Examples of one or more clock fault notifications are discussed in more detail below with respect to FIG. 3.

Figure 1D:
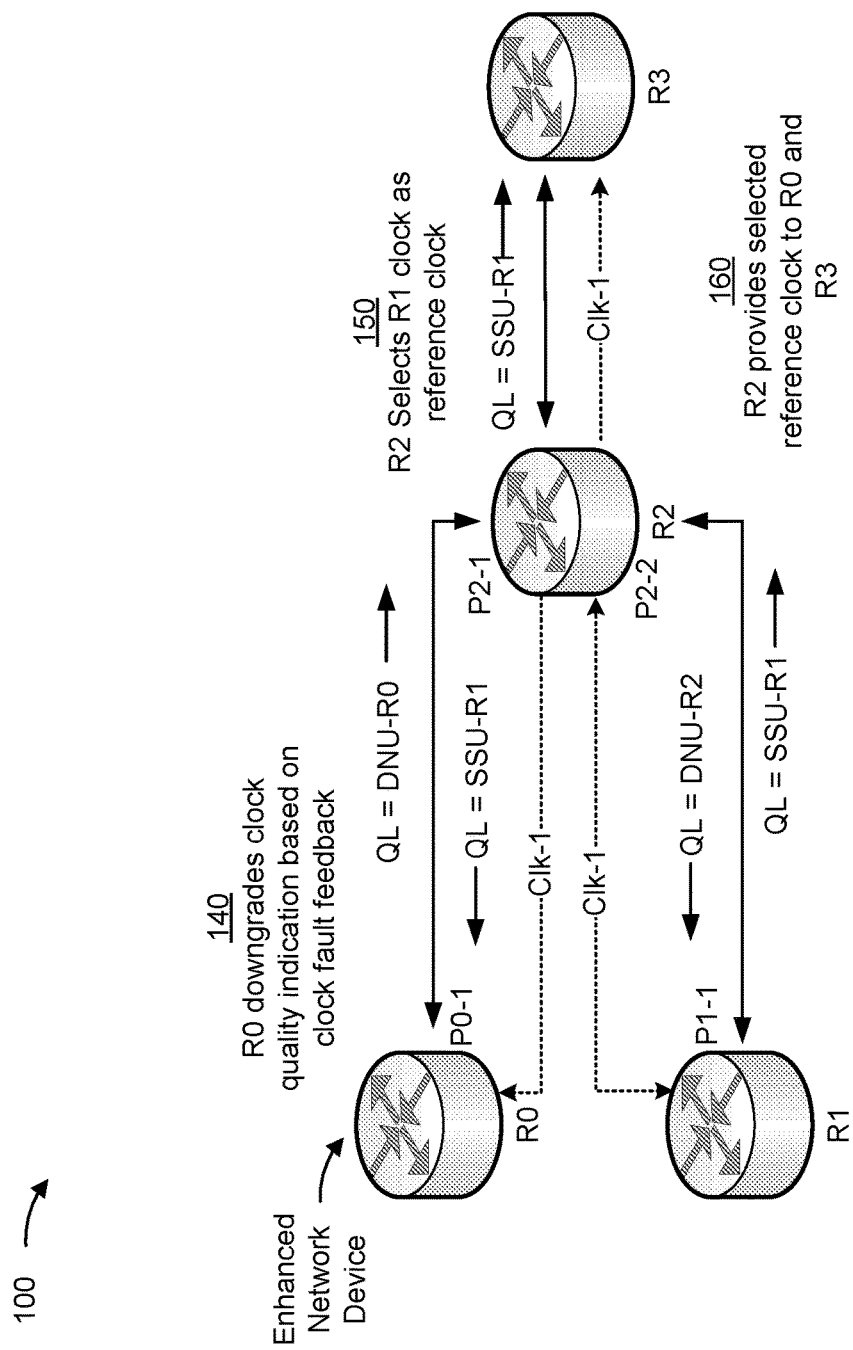

As shown in FIG. 1D, and by reference number 140, the clock fault notification may be configured to cause R0 to downgrade the clock quality indication (e.g., to a lower priority clock quality indication, to a clock quality indication of DNU, to a clock quality indication indicating a clock failure, and/or the like) transmitted by R0. For example, R0, based on received the clock fault notification from R2, may transmit a clock quality indication of DNU to R2.

As shown by reference number 150, R2 may select the clock signal of R1 (e.g., Clk-1) as the new reference clock based on receiving the downgraded clock quality indication from R0. For example, R2 may select the clock signal of R1 as the new reference clock in a similar manner as described above (e.g., using BMCA and/or the like). R2 may compare a clock quality indication received from R1 (e.g., SSU) to the clock quality indication received from R0 (e.g., DNU). R2 may select the clock signal of R1 based on the clock quality indication received from R1 having a higher priority than the clock quality indication received from R0 (e.g., the downgraded clock quality indication). In some implementations, R2 may receive clock signals and associated clock quality indications from one or more other network devices when determining a clock signal to select as the new reference clock for the synchronous network. R2 may transmit a clock quality indication of DNU to R1 based on selecting the clock signal of R1 as the reference clock (e.g., indicating to R1 that R1 should not use a clock signal sent by R2 as the reference clock).

As shown by reference number 160, R2 may provide the selected reference clock to R0, R3, and/or one or more other network devices. For example, R2 may generate a clock signal (e.g., Clk-1) that is the same as the clock signal received from R1. R2 may transmit the clock signal and the associated clock quality indication (e.g., SSU) to R0 and/or R3. For example, R2 may transmit the clock signal (e.g., Clk-1) via the physical layer of the synchronous network to R0 and/or R3. R2 may transmit the clock quality indication of SSU via the ESMC of the synchronous network to R0 and/or R3. As a result, the clock signal (e.g., Clk-1) may be selected as the reference clock for R0, R1, R2, and/or R3 and may be used to synchronize R0, R1, R2, and/or R3 (e.g., according to a synchronous Ethernet protocol). In some implementations, R0 may not select the clock signal of R1 as the reference clock. For example, R0 may receive a clock quality indication of PRC from one or more other network devices (not shown) upstream from R0. As a result, R0 may select the clock signal transmitted by the one or more other network devices as the clock quality indication transmitted by the one or more other network devices (e.g., PRC) has a higher priority than the clock quality indication transmitted by R1 (e.g., SSU).

Figure 1E:
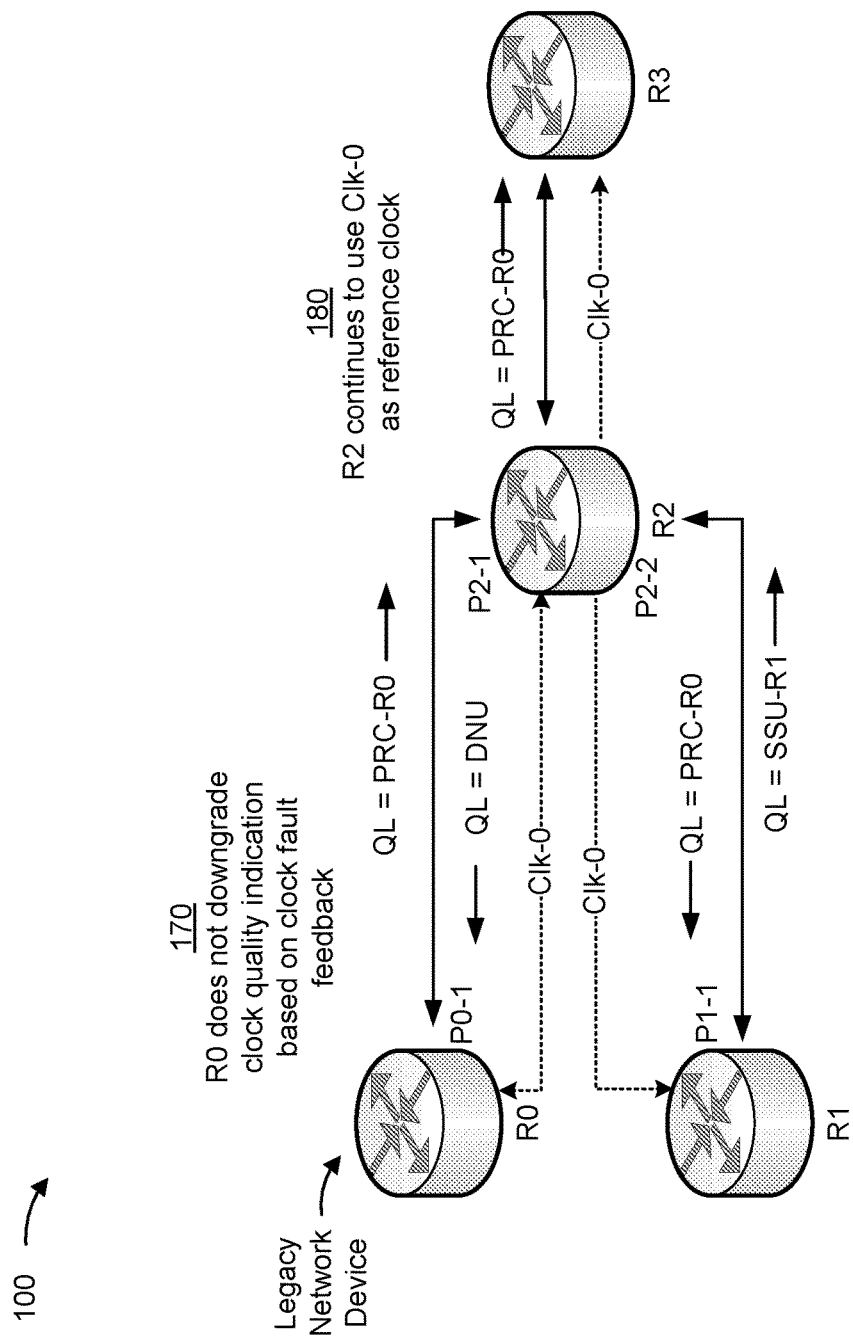

As shown in FIG. 1E, an alternative to FIG. 1D is shown. That is, the network devices may either perform the actions described with respect to FIG. 1D or the actions described with respect to FIG. 1E. Whether the network devices perform the actions described with respect to FIG. 1D or FIG. 1E may be based on whether R0 is a legacy network device (e.g., not configured to detect the clock fault notification) or an enhanced or updated network device (e.g., configured to detect the clock fault notification). If R0 is an enhanced or updated network device (e.g., is configured to perform one or more of the functions described herein), the network devices may perform the actions described with respect to FIG. 1D. If R0 is a legacy network device, the network devices may perform the actions described with respect to FIG. 1E. In some implementations, R0 may not be configured to detect the clock fault notification. For example, R0 may be a legacy network device (e.g., may not be updated, may not be upgraded, or may be otherwise unable to detect the clock fault notification). In that case, R0 may not perform any actions associated with receiving the clock fault notification.

As shown by reference number 170, after R2 provides the clock fault notification to R0, R0 may not downgrade the clock quality indication transmitted by R0 to R2. That is, R2 may continue to transmit a clock quality indication of PRC to R0. For example, if R0 is not configured to detect the clock quality notification, R0 may continue to transmit the clock quality indication of PRC as R0 may ignore the clock fault notification, drop a packet carrying the clock fault notification (e.g., based on R0 not being configured to process the type of packet), and/or the like. For example, if R0 is a legacy network device, R2 may transmit the clock fault notification in a new type of SSM that is different from the type of SSM used to transmit the clock quality indications. R0 may not be configured to process the new type of SSM and, as a result, may drop the new type of SSM carrying the clock fault notification. Configurations of clock fault notifications for legacy network devices are discussed in more detail below with respect to FIG. 3.

As shown by reference number 180, R2 may continue to use the clock signal of R0 (e.g., Clk-0) as the reference clock based on R0 not downgrading the clock quality indication transmitted to R2. For example, the clock quality indication transmitted by R0 may still be PRC, which has a higher priority than the clock quality indication transmitted by R1 (e.g., SSU). As a result, R2 may continue to select the clock signal of R0, rather than the clock signal of R1. As such, R2 may continue to transmit a clock signal of Clk-0 to R1, R3, and/or one or more other network devices along with a clock quality indication of PRC.

Figure 1F:
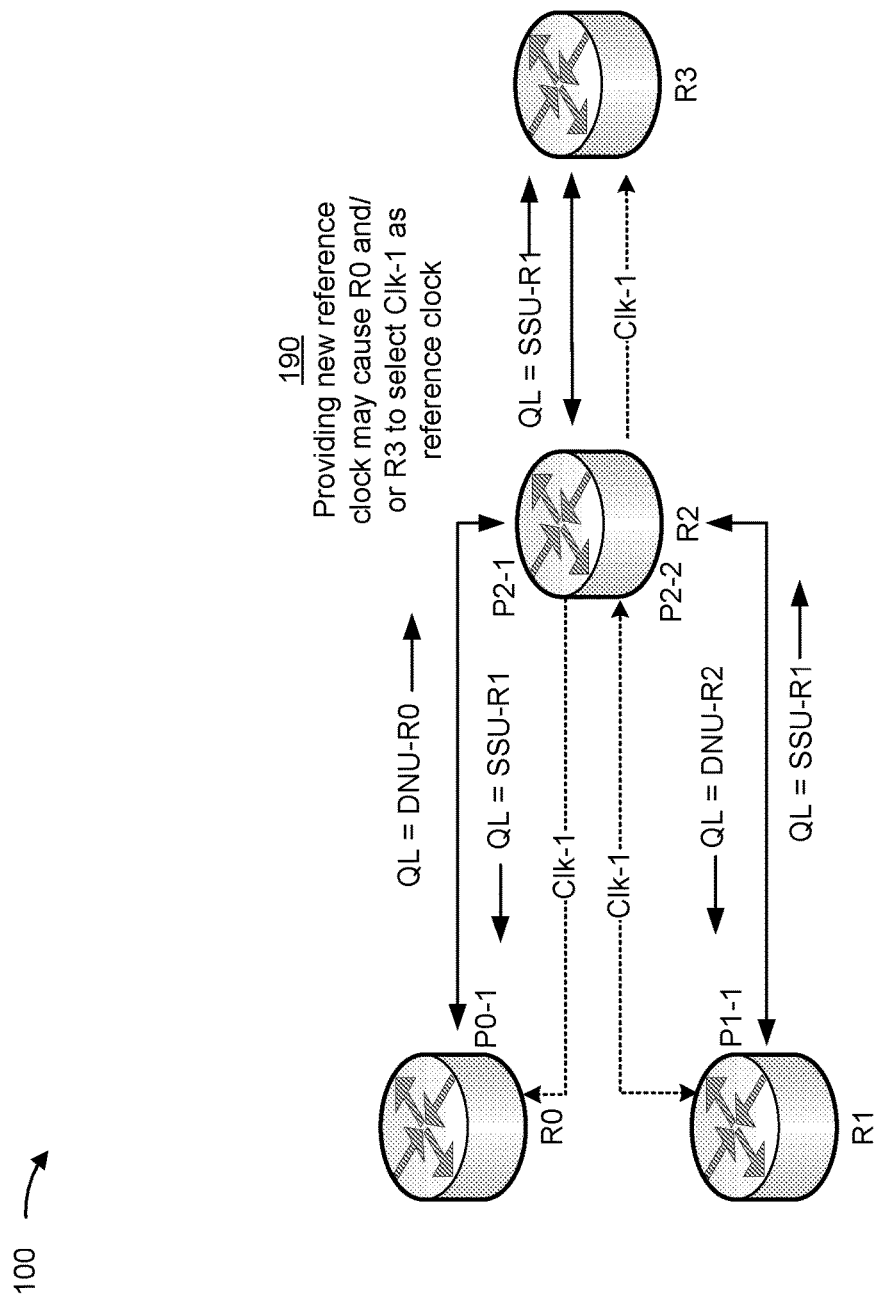

As shown in FIG. 1F, and by reference number 190, R2 providing the new reference clock signal (e.g., Clk-1) may cause R0, and/or R3 to use the clock of R1 as the new reference clock for the synchronous network and to transmit the clock signal (e.g., Clk-1) to other network devices along with a clock quality indication of SSU (e.g., the clock quality indication transmitted by R1). For example, R0, and/or R3 may select the clock signal of R1 as the reference clock for the synchronous network. As a result, R0, and/or R3 may transmit the clock signal of R1 and an associated clock quality indication of SSU to one or more other network devices of the synchronous network. This may cause the one or more other network devices of the synchronous network to select the clock signal of R1 as the reference clock for the synchronous network. In some implementations, if R0, R3, and/or one or more other network devices are receiving a higher priority clock quality indication (e.g., PRC) from another network device, R0, R3, and/or the one or more other network devices may select the clock signal of the network devices transmitting the higher priority clock quality indication, rather than the clock signal of R1.

As a result, the network devices of the synchronous network may synchronize using the clock signal of R1, rather than the clock signal of R0 which was determined to be associated with a clock fault or a poor quality. Therefore, the synchronous network will not use a poor clock signal (e.g., Clk-0) to synchronize the network devices of the synchronous network. This may conserve computing resources and/or network resources that would have otherwise been used synchronizing the network devices of the synchronous network using the poor clock signal. Moreover, ensuring that the poor clock signal is not used to synchronize the network devices of the synchronous network may improve performance and reliability of communications sent over the synchronous network by the network devices.

As indicated above, FIGS. 1A-1F are provided as an example. Other examples may differ from what is described with regard to FIGS. 1A-1F The number and arrangement of devices shown in FIGS. 1A-1F are provided as an example. In practice, there may be additional devices, fewer devices, different devices, or differently arranged than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
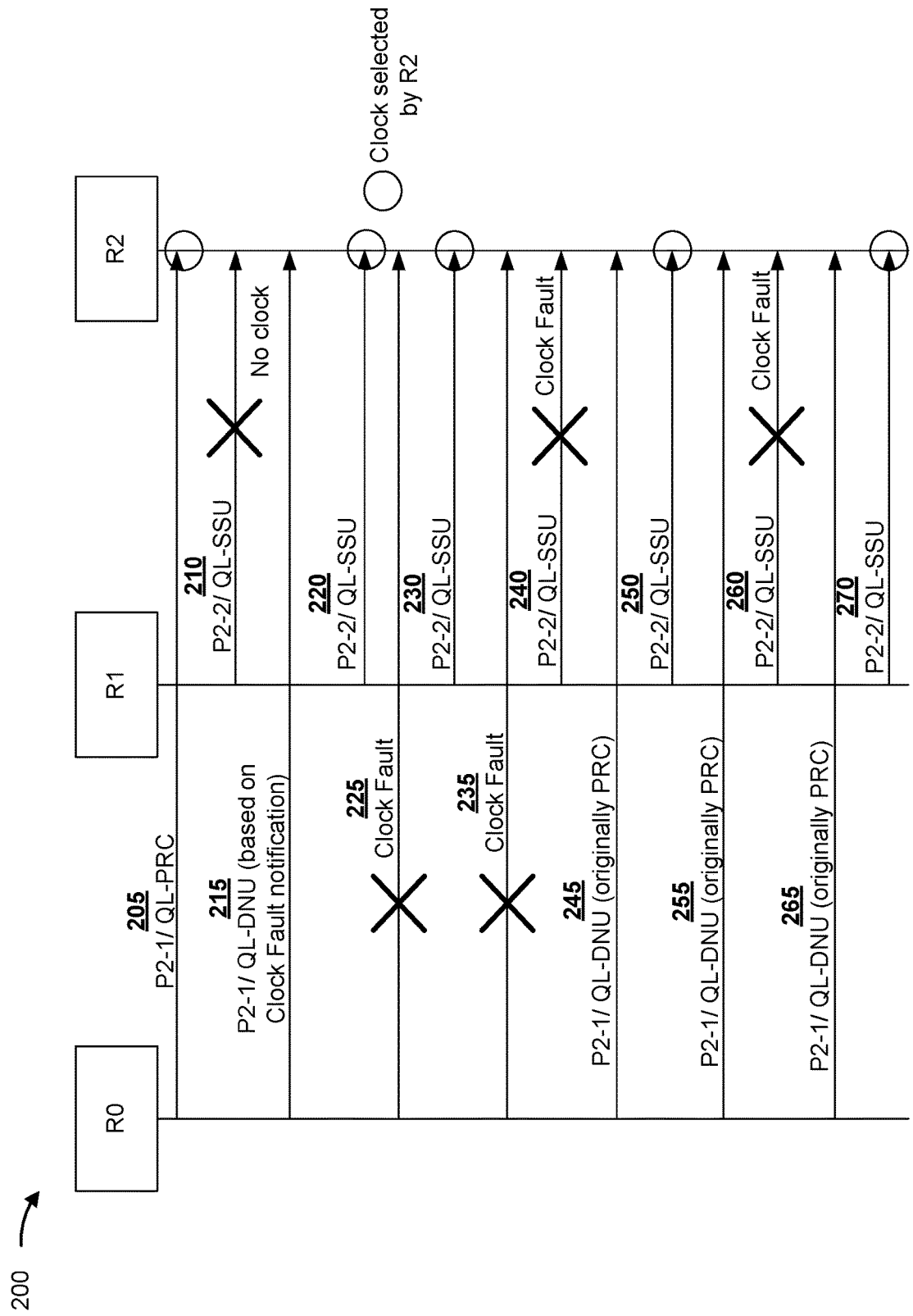
FIG. 2 is a diagram of an example implementation described herein.

FIG. 2 is a diagram of an example implementation 200 described herein. As shown in FIG. 2, example implementation 200 includes a network device (e.g., R2) receiving clock quality indications (QL) from a second network device (e.g., R0) and a third network device (e.g., R1) in a synchronous network. R0, R1, and R2 may correspond to the network devices R0, R1, and R2 described above with respect to FIGS. 1A-1E.

As shown in FIG. 2, R2 may select different clocks to be the reference clock of the synchronous network at different points in time. For example, as indicated by a circled arrow, R2 may select a clock signal received from R0 or R1 based on a clock quality indication received from R0 or R1 and/or a clock fault detected by R2. R2 may receive clock signals and clock quality indications and select a reference clock in a similar (or the same) manner as described above with respect to FIGS. 1A-1F.

Clock quality indications received from different network devices may be received in different ports of R2. For example, clock quality indications received by R2 from R0 may be received in a first port of R2 (e.g., P2-1). Clock quality indications received by R2 from R1 may be received in a second port of R2 (e.g., P2-2).

As shown in FIG. 2, and by reference number 205, R2 may receive a clock quality indication of primary reference clock (PRC) from R0 via port P2-1 of R2. As shown by reference number 210, R2 may determine that R1 is not transmitting a clock (e.g., no clock) at that time or that the clock quality indication transmitted by R1 is a lower priority (e.g., SSU). As a result, R2 may select the clock of R0 as the reference clock for the synchronous network. R2 may determine that a clock fault has occurred with the physical clock signal received from R0 (e.g., based on determining a quality metric of the clock signal received from R0 does not satisfy a threshold, in a similar manner as described above with respect to FIGS. 1A-1F). R2 may transmit a clock fault notification to R0 based on determining that the clock fault has occurred. As a result, as shown by reference number 215, R0 may downgrade the clock quality indication transmitted by R0 to do not use (DNU).

As shown by reference number 220, R2 may receive a clock quality indication of SSU from R1 via port P2-2 of R2. R2 may select the clock of R1 to be the reference clock of the synchronous network based on detecting the clock fault associated with R0, R0 downgrading the clock quality indication to DNU, and/or the clock quality indication from R1 of SSU. For example, the clock signal transmitted by R0 may have a high frequency error rate (e.g., 4.1 PPM and/or the like) even though the clock quality indication transmitted by R0 (e.g., PRC) indicates a high quality clock. The clock signal of R1 may have lower frequency error rate (e.g., 0 ppm and/or the like) even though the clock quality indication transmitted by R1 (e.g., SSU) indicates a lower priority than the clock quality indication transmitted by R0. As a result, R2 may be enabled to select the clock signal with a lower frequency error rate (e.g., the clock signal transmitted by R1) as a reference clock even though the clock quality indication transmitted by R1 (e.g., SSU) has a lower priority than the clock quality indication initially transmitted by R2 (e.g., the clock quality indication initially transmitted by R2 was PRC but is now DNU, enabling R2 to select the clock signal transmitted by R1 as the reference clock).

As shown by reference number 225 and reference number 235, R2 may receive additional clock quality indications from R0 and may determine that the clock quality indications indicate DNU or that the clock of R0 has not recovered from the clock fault (e.g., indicated by the arrows labeled Clock Fault in FIG. 2). As shown by reference number 230, R2 may continue to select the clock of R1 as the reference clock for the synchronous network during this time.

As shown by reference number 240, R2 may determine that a clock fault has occurred with the clock of R1 (e.g., based on determining a quality metric of the clock signal received from R1 does not satisfy a threshold, in a similar manner as described above with respect to FIGS. 1A-1F). R2 may transmit a clock fault notification to R1. Additionally, R2 may determine that the clock of R0 has not recovered from the clock fault. As a result, R2 may not select a clock for the reference clock of the synchronous network during this time (e.g., where all clock signals received by R2 have not recovered from a clock fault). During this time, R2 may be in a hold-over state or free-run state.

As shown by reference number 245, R2 may determine that the clock quality indication transmitted by R0 is DNU, whereas the clock quality indication was originally PRC. As a result, R2 may not select the clock of R0 to be the reference clock of the synchronous network. R2 may determine that the clock of R1 has recovered from the clock fault (e.g., based on an indication received from R1, based on determining that a quality metric of the clock signal received from R1 satisfies the threshold value, and/or the like). As shown by reference number 250, R2 may determine that the clock quality indication transmitted by R1 is SSU. R2 may select the clock of R1 to be the reference clock of the synchronous network (e.g., based on the clock quality indication of SSU).

As shown by reference number 260, R2 may determine that another clock fault associated with the clock of R1 has occurred. Additionally, as shown by reference number 255, R2 may determine that the most recent clock quality indication received from R0 is DNU. As a result, R2 may not select a clock to be the reference clock and may enter a hold-over state or free-run state.

As shown by reference number 265, R0 may continue to transmit a clock quality indication of DNU. As shown by reference number 270, R2 may determine that the clock of R1 has recovered from the clock fault (e.g., based on an indication received from R1, based on determining that a quality metric of the clock signal received from R1 satisfies the threshold value, and/or the like). R2 may determine that the clock quality indication transmitted by R1 is SSU. As a result, R2 may select the clock of R1 to be the reference clock for the synchronous network.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIG. 3 includes diagrams of one or more example clock fault notification configurations 300 described herein. As shown in FIG. 3, clock quality indications (QL) may be transmitted in one or more packets via the Ethernet communication layer of the synchronous network. The packets may use synchronization status message (SSM) formats that include different TLV fields to indicate a type of TLV format or type of SSM, a length of the TLV, an SSM code (e.g., associated with clock quality indications, such an PRC, SSU, SEC, DNU, and/or the like), and/or one or more unused fields. For example, the tables (e.g., Table 1 and Table 2) shown in FIG. 3 may represent a configuration of a QL-TLV format transmitted via the Ethernet synchronous messaging channel (ESMC) of the synchronous network.

As described above, a network device of the synchronous network may transmit a clock quality indication using a first type of SSM format. The first type of SSM format may be an SSM TLV format. The first type of SSM format may be modified to include a fault notification. The configuration of the first type of SSM format may be as shown in Table 1. For example, 8 bits may be used to indicate the type of SSM, 16 bits may be used to indicate the length of the SSM, 4 bits may be used to indicate an SSM code, and 4 bits may be unused. The SSM codes may indicate a clock quality indication as described above with respect to FIGS. 1A-1F. For example, as SSM code of 0010 may indicate PRC, an SSM code of 0100 may indicate SSU-A, an SSM code of 1000 may indicate SSU-B, an SSM code of 1011 may indicate SEC, and an SSM code of 1111 may indicate DNU.

In some implementations, a fault code may be inserted into the first type of SSM format using the unused field (e.g., the 4 unused bits). For example, the first type of SSM format may be configured such that the fault code (e.g., in the 4 unused bits) indicates a default state or no fault state (e.g., using the fault code of "0000"). The first type of SSM format may be configured such that the fault code (e.g., in the 4 unused bits) indicates a clock fault state (e.g., using the fault code of "0001"). The first type of SSM format may be used to transmit an SSM in a similar manner as described above (e.g., via the ESMC of the synchronous network). A receiving network device may be configured to detect the fault code in the first type of SSM format, such that the receiving network device may detect a fault code of "0001" in the first type of SSM format and determine that a transmitting network device has detected a clock fault associated with the clock of the receiving network device.

In some implementations, a receiving network device may not be configured to detect the fault code in the first type of SSM format. For example, a receiving network device may be a legacy network device that has not been updated, upgraded, enabled to detect the fault code, and/or the like. A legacy network device may experience a failure (e.g., a timeout, a processing error, and/or the like) associated with processing the first type of SSM format with a fault code. In some implementations, the legacy network device may ignore the information included in the previously unused field of the SSM format. For example, the legacy device may attempt to process the first type of SSM format based on recognizing the first type of SSM format. The SSM format may experience a failure associated with processing the fault code within the first type of SSM format.

In some implementations, the fault code may be indicated in a second type of SSM format. The second type of SSM format may be a new TLV format type. The configuration of the second type of SSM format may be as shown in Table 2. For example, 8 bits may be used to indicate the second type of SSM format (e.g., Type: 0x03 and/or the like), 16 bits may be used to indicate the length of the SSM, 4 bits may be used to indicate the fault code, and 4 bits may be reserved and/or unused. The second type of SSM format may be sent by a network device to indicate a clock fault (e.g., a clock fault notification) and may be separate from the SSM sent to indicate a clock quality indication (e.g., the first type of SSM format).

A legacy network device may not recognize the second type of SSM format, as the second type of SSM format may be a new SSM format. As a result, the legacy network device may drop or reject an SSM using the second type of SSM format. Therefore, the legacy network device will not attempt to process the SSM using the second type of SSM format and may not experience the failures associated with processing the SSM, as described above. In this way, a network device may be enabled to use the second type of SSM format to indicate a clock fault to other network devices having the same configuration (e.g., configured to detect and/or process the fault code in an SSM), while not causing legacy network devices to experience failures associated with processing the fault code.

A network device that detects a clock fault may transmit the modified TLV (e.g., shown in Table 1) when the network device associated with the clock fault is an enhanced or updated network device. This may cause the enhanced or updated network device to perform actions as described above with respect to FIG. 1D. In some implementations, if the network device that detects a clock fault determines that the network device associated with the clock fault is a legacy network device, the network device may transmit the new TLV type (e.g., shown in Table 1). This may cause the legacy network device to perform actions as described above with respect to FIG. 1E.

As indicated above, FIG. 3 is provided as one or more examples. Other examples may differ from what is described with regard to FIG. 3.

Figure 4A:
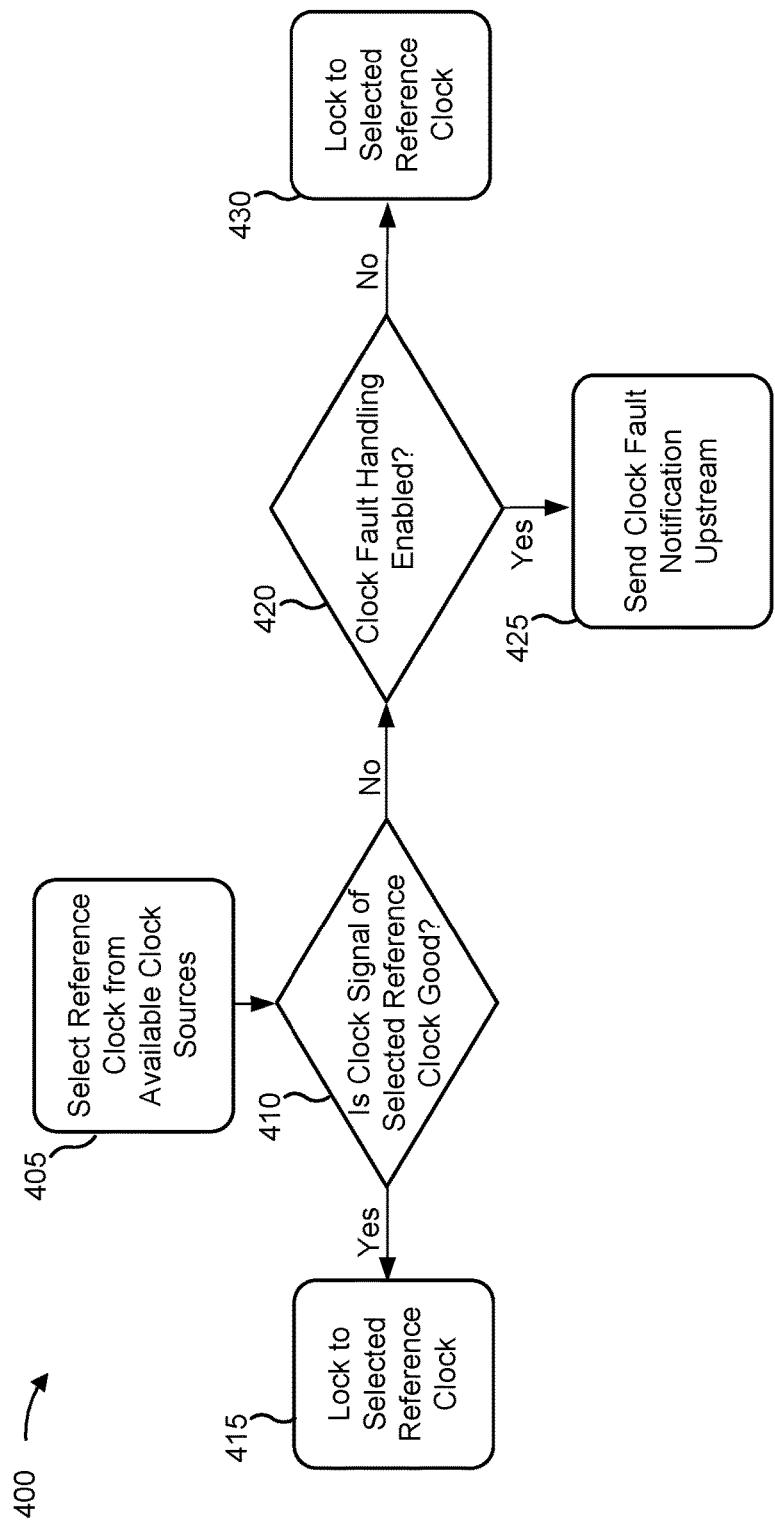
FIG. 4A is a diagram of an example process of a network device detecting a clock fault described herein.

FIG. 4A is a diagram of an example process 400 of a network device detecting a clock fault as described herein. In some implementations, one or more process blocks of FIG. 4 may be performed by the network devices of FIGS. 1A-1F and/or FIG. 2 (e.g., R0, R1, R2, R3, and/or the like). Example process 400 may include the steps or actions performed by a network device upon selecting a reference clock as described above.

As shown by reference number 405, a network device may select a reference clock from all available clock sources. For example, the network device may select a reference clock according to a best master clock algorithm (BMCA). The network device may select the reference clock in a similar manner as described above with respect to FIGS. 1A-1F.

As shown by reference number 410, the network device may determine whether the clock signal of the selected reference clock is good. For example, the network device may determine whether a quality metric of the clock signal satisfies a threshold (e.g., using a phase-locked loop of the network device). The network device may determine whether the clock signal of the selected reference clock is good in a similar manner as described above with respect to FIGS. 1A-1F.

As shown by reference number 415, if the network device determines that the clock signal of the selected reference clock is good (e.g., a quality metric of the clock signal satisfies a threshold), then the network device may lock to the selected reference clock. The network device may operate according to international telecommunication union (ITU) telecommunication standardization section (ITU-T) recommendations for Synchronous Ethernet clocks, Ethernet Synchronization Messaging Channels, and/or the like (e.g., ITU-T Rec. G.8262, G.8264, and/or the like) after locking to the selected reference clock.

As shown by reference number 420, if the network device determines that the clock signal of the selected reference clock is not good (e.g., a quality metric of the clock signal does not satisfy a threshold), then the network device may determine whether clock fault handling is enabled. That is, the network device may determine whether the network device is enabled to notify upstream network device(s) of the poor clock signal. For example, if the network device is a legacy network device (e.g., a network device that is not configured to have the capability of detecting the clock fault notification or notifying other network devices of the clock fault) the network device may determine that clock fault handling is not enabled.

As shown by reference number 425, if the network device determines that clock fault handling is enabled, the network device may send clock fault notification upstream to the network device that sent the clock signal of the selected reference clock and/or to one or more other network devices. The network device may send the clock fault notification in a similar manner as described above with respect to FIGS. 1A-1F, 2, and 3.

As shown by reference number 430, if the network device determines that clock fault handling is not enabled (e.g., if the network device is a legacy network device) then the network device may lock to the selected reference clock (e.g., with a poor clock signal). The network device may operate according to ITU-T recommendations for Synchronous Ethernet clocks, Ethernet Synchronization Messaging Channels, and/or the like (e.g., ITU-T Rec. G.8262, G.8264, and/or the like) after locking to the selected reference clock.

Although FIG. 4A shows example blocks of example process 400, in some implementations, example process 400 may include additional blocks, fewer blocks, different blocks, or differently arranged blocks than those depicted in FIG. 4A. Additionally, or alternatively, two or more of the blocks of process 400 may be performed in parallel.

Figure 4B:
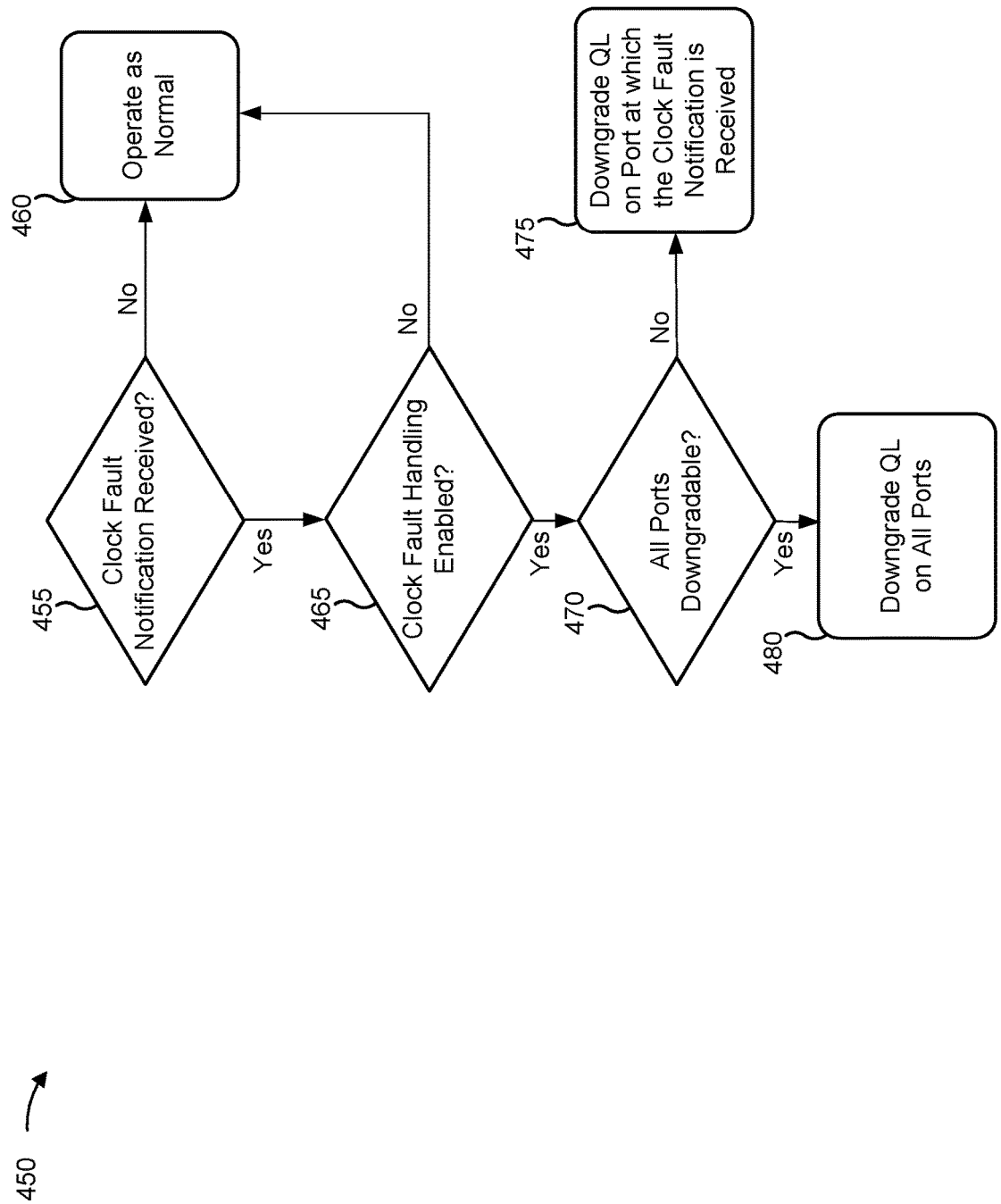
FIG. 4B is a diagram of an example process of a network device experiencing a clock fault described herein.

FIG. 4B is a diagram of an example process 450 of a network device experiencing a clock fault described herein. In some implementations, one or more process blocks of FIG. 4B may be performed by the network devices of FIGS. 1A-1F and/or FIG. 2 (e.g., R0, R1, R2, R3, and/or the like). Example process 450 may include the steps or actions performed by a network device upon receiving a clock fault notification as described above.

As shown by reference number 455, the network device may determine whether a clock fault notification has been received. If a clock fault notification has not been received, the network device may continue to operate as normal, as shown by reference number 460. For example, the network device may operate according to ITU-T recommendations for Synchronous Ethernet clocks, Ethernet Synchronization Messaging Channels, and/or the like (e.g., ITU-T Rec. G.8262, G.8264, and/or the like) if not clock fault notification has been received.

As shown by reference number 465, if the network device determines that a clock fault notification has been received, the network device may determine whether clock fault handling is enabled. For example, a legacy network device (e.g., a network device that is not configured to have the capability of detecting the clock fault notification) may determine that clock fault handling is not enabled. As shown by reference number 460, If the network device determines that clock fault handling is not enabled, the network device may continue to operate as normal (e.g., receiving a clock fault notification may not impact or change the performance of the network device that does not have clock fault handling enabled). For example, the network device may operate according to ITU-T recommendations for Synchronous Ethernet clocks, Ethernet Synchronization Messaging Channels, and/or the like (e.g., ITU-T Rec. G.8262, G.8264, and/or the like) if clock fault handling is not enabled for the network device.

As shown by reference number 470, if the network device determines that a clock fault notification has been received, the network device may determine whether all ports of the network device are downgradable. For example, the network device may be transmitting a clock quality indication to one or more other network devices using one or more ports of the network device. The network device may determine that one or more of the ports of the network device are not capable of being downgraded (e.g., based on a configuration of the network device, a communication status of the network device, an operating status of the network device, and/or the like). For example, the network device may determine that some ports, but not all ports, of the network device are capable of being downgraded.

As shown by reference number 475, if the network device determines that one or more ports of the network device are not capable of being downgraded, the network device may downgrade the clock quality indication (QL) on the port at which the clock fault notification is received. For example, if the network device received the clock quality notification in a first port, the network device may downgrade the clock quality indication being transmitted by the network device via the first port.

As shown by reference number 480, if the network device determines that all ports of the network device are capable of being downgraded, the network device may downgrade the clock quality indication being transmitted by the network device on all ports. In some implementations, the network device may adjust a clock signal of the clock of the network device based on receiving the clock fault notification.

The network device may continue to transmit the downgraded clock quality indication until the network device determines that the clock of the network device has recovered from the clock fault. In some implementations, the network device may determine that the clock of the network device has recovered from the clock fault based on a measurement of a quality metric of the clock performed by the network device, based on a restart or shutdown of the network device, based on an indication received from a different network device, and/or the like.

Although FIG. 4 shows example blocks of example process 400, in some implementations, example process 400 may include additional blocks, fewer blocks, different blocks, or differently arranged blocks than those depicted in FIG. 4. Additionally, or alternatively, two or more of the blocks of process 400 may be performed in parallel.

Figure 5:
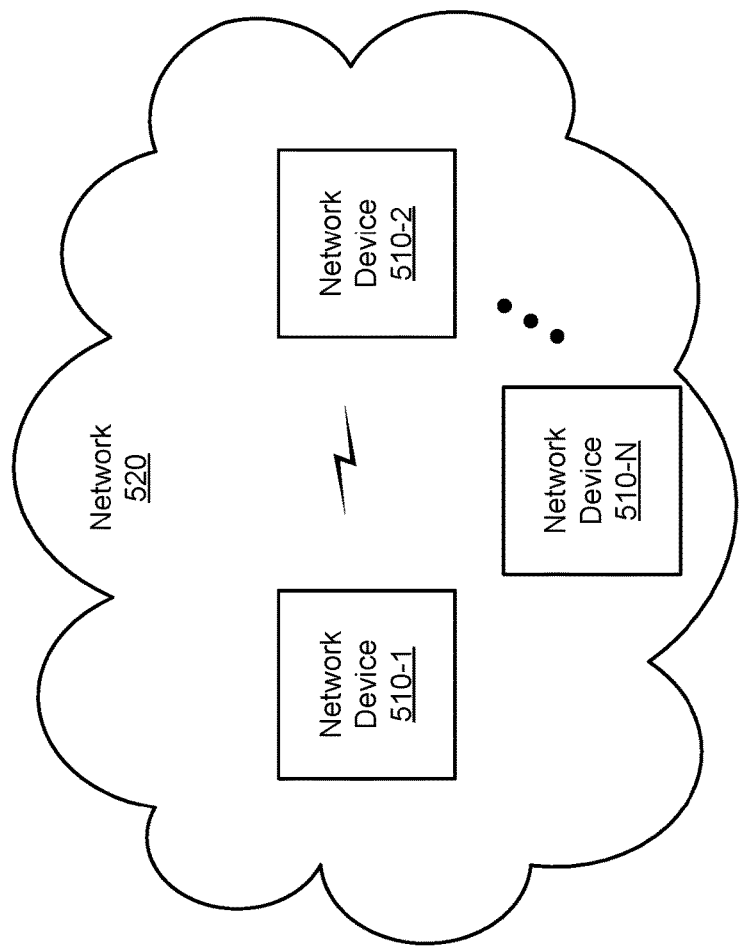
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a group of network devices 510 (shown as network device 510-1 through network device 510-N), and a network 520. Devices of environment 500 may interconnect via wired connections, wireless connections, or a combination of wired and wireless connections.

Network device 510 includes one or more devices capable of receiving, processing, storing, routing, and/or providing traffic (e.g., a packet, other information or metadata, and/or the like) in a manner described herein. For example, network device 510 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 510 may include a gateway, a switch, a firewall, a hub, a bridge, a reverse proxy, a server (e.g., a proxy server, a cloud server, a data center server, and/or the like), a load balancer, and/or a similar device. In some implementations, network device 510 may be a physical device implemented within a housing, such as a chassis. In some implementations, network device 510 may be a virtual device implemented by one or more computer devices of a cloud computing environment or a data center. In some implementations, a group of network devices 510 may be a group of data center nodes that are used to route traffic flow through network 520.

Network 520 includes one or more wired and/or wireless networks. For example, network 520 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
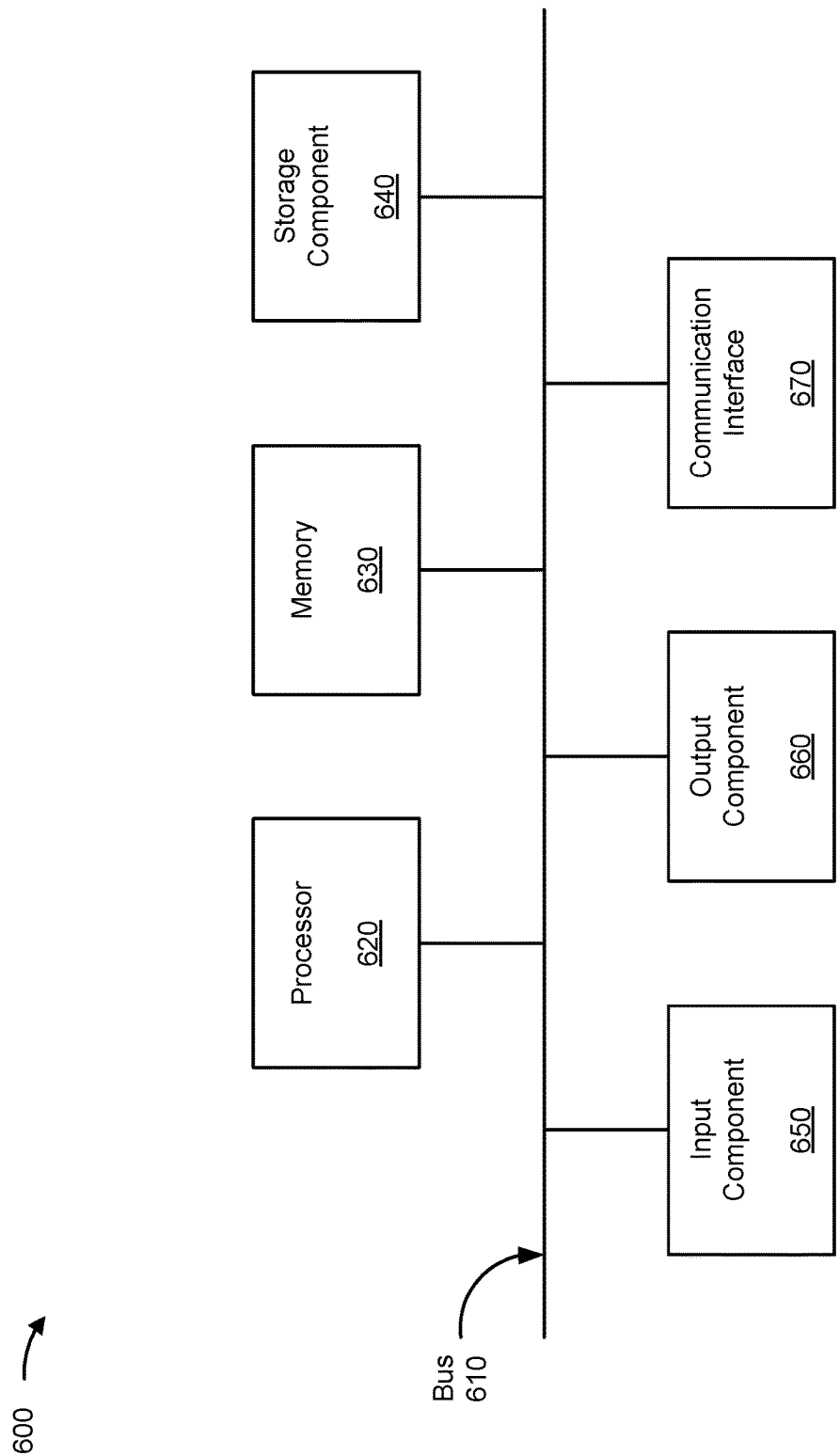
FIG. 6 is a diagram of example components of one or more devices of FIG. 5.

FIG. 6 is a diagram of example components of a device 600. Device 600 may correspond to one or more network devices 510-1 through 510-N, and/or the like. In some implementations, one or more network devices 510-1 through 510-N may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more LEDs).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, an RF interface, a universal serial bus (USB) interface, a wireless local area interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
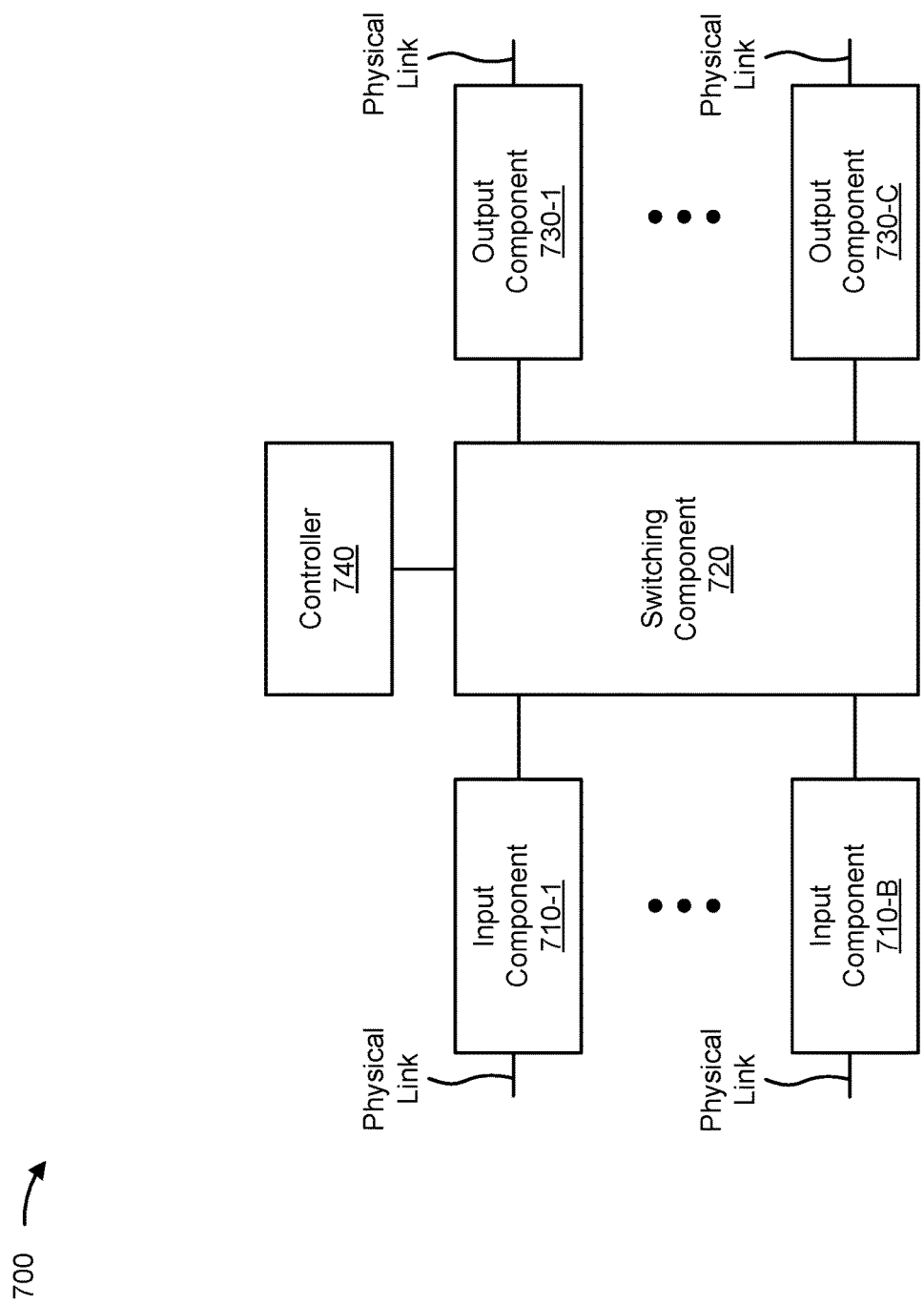
FIG. 7 is a diagram of example components of one or more devices of FIG. 5.

FIG. 7 is a diagram of example components of a device 700. Device 700 may correspond to one or more network devices 510-1 through 510-N, and/or the like. In some implementations, one or more network devices 510-1 through 510-N, and/or the like may include one or more devices 700 and/or one or more components of device 700. As shown in FIG. 7, device 700 may include one or more input components 710-1 through 710-B (B≥1) (hereinafter referred to collectively as input components 710, and individually as input component 710), a switching component 720, one or more output components 730-1 through 730-C (C≥1) (hereinafter referred to collectively as output components 730, and individually as output component 730), and a controller 740.

Input component 710 may be one or more points of attachment for physical links and may be one or more points of entry for incoming traffic, such as packets. Input component 710 may process incoming traffic, such as by performing data link layer encapsulation or decapsulation. In some implementations, input component 710 may transmit and/or receive packets. In some implementations, input component 710 may include an input line card that includes one or more packet processing components (e.g., in the form of integrated circuits), such as one or more interface cards (IFCs), packet forwarding components, line card controller components, input ports, processors, memories, and/or input queues. In some implementations, device 700 may include one or more input components 710.

Switching component 720 may interconnect input components 710 with output components 730. In some implementations, switching component 720 may be implemented via one or more crossbars, via busses, and/or with shared memories. The shared memories may act as temporary buffers to store packets from input components 710 before the packets are eventually scheduled for delivery to output components 730. In some implementations, switching component 720 may enable input components 710, output components 730, and/or controller 740 to communicate with one another.

Output component 730 may store packets and may schedule packets for transmission on output physical links. Output component 730 may support data link layer encapsulation or decapsulation, and/or a variety of higher-level protocols. In some implementations, output component 730 may transmit packets and/or receive packets. In some implementations, output component 730 may include an output line card that includes one or more packet processing components (e.g., in the form of integrated circuits), such as one or more IFCs, packet forwarding components, line card controller components, output ports, processors, memories, and/or output queues. In some implementations, device 700 may include one or more output components 730. In some implementations, input component 710 and output component 730 may be implemented by the same set of components (e.g., and input/output component may be a combination of input component 710 and output component 730).

Controller 740 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 740 may include one or more processors that can be programmed to perform a function.

In some implementations, controller 740 may include a RAM, a ROM, and/or another type of dynamic or static storage device (e.g., a flash memory, a magnetic memory, an optical memory, etc.) that stores information and/or instructions for use by controller 740.

In some implementations, controller 740 may communicate with other devices, networks, and/or systems connected to device 700 to exchange information regarding network topology. Controller 740 may create routing tables based on the network topology information, may create forwarding tables based on the routing tables, and may forward the forwarding tables to input components 710 and/or output components 730. Input components 710 and/or output components 730 may use the forwarding tables to perform route lookups for incoming and/or outgoing packets.

Controller 740 may perform one or more processes described herein. Controller 740 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 740 from another computer-readable medium or from another device via a communication interface. When executed, software instructions stored in a memory and/or storage component associated with controller 740 may cause controller 740 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
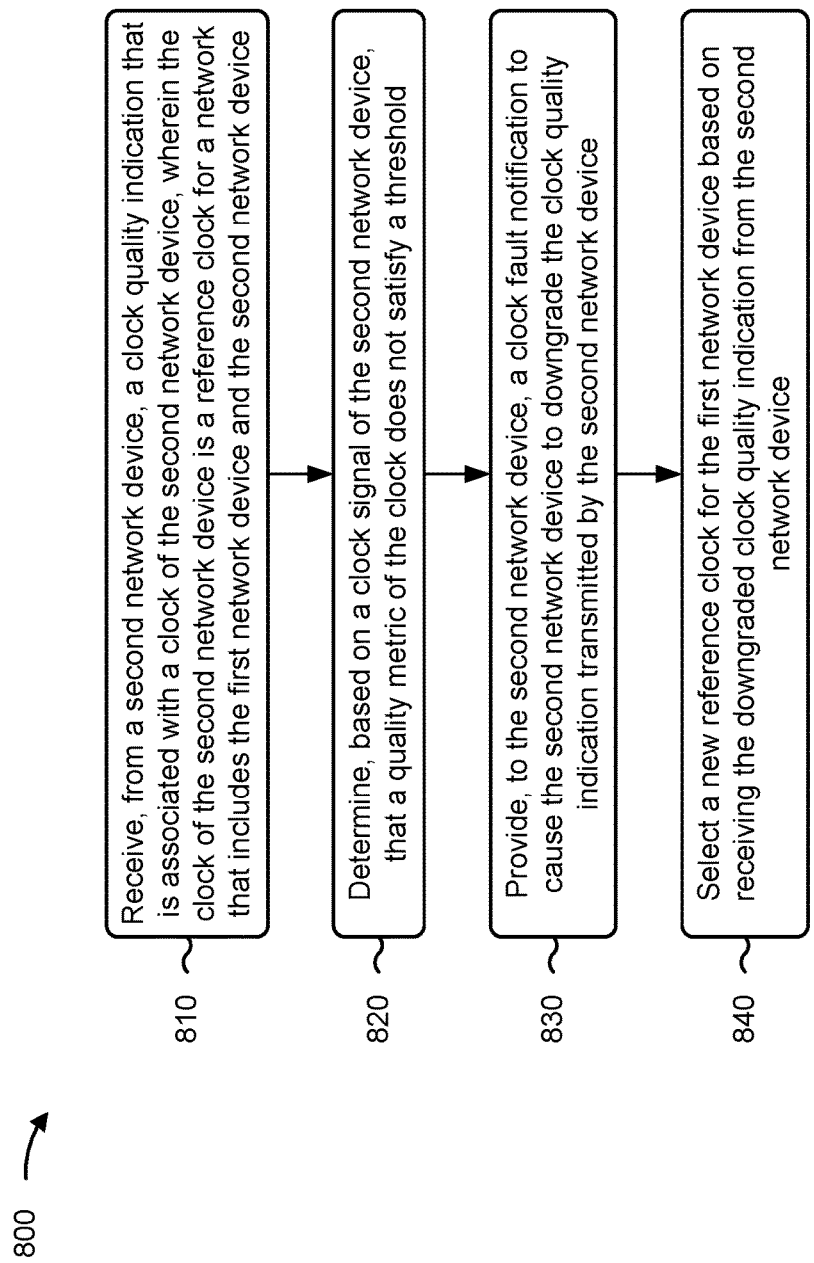
FIGS. 8-10 are flow charts of example processes relating to clock fault detection and correction between synchronized network devices.

FIG. 8 is a flow chart of an example process 800 associated with clock fault detection and correction between synchronized network devices. In some implementations, one or more process blocks of FIG. 8 may be performed by a first network device (e.g., network device 510-1). In some implementations, one or more process blocks of FIG. 8 may be performed by another device or a group of devices separate from or including the first network device, such as one or more other network devices (e.g., network device 510-2, network device 510-N, and/or the like), and/or the like. Additionally, or alternatively, one or more process blocks of FIG. 8 may be performed by one or more components of a device 600 (e.g., processor 620, memory 630, storage component 640, input component 650, output component 660, communication interface 670, and/or the like), a device 700 (e.g., input component 710, switching component 720, output component 730, controller 740, and/or the like), and/or the like.

As shown in FIG. 8, process 800 may include receiving, from a second network device, a clock quality indication that is associated with a clock of the second network device, wherein the clock of the second network device is a reference clock for a network that includes the first network device and the second network device (block 810). For example, the first network device may receive, from a second network device, a clock quality indication that is associated with a clock of the second network device, as described above. In some implementations, the clock of the second network device is a reference clock for a network that includes the first network device and the second network device.

As further shown in FIG. 8, process 800 may include determining, based on a clock signal of the second network device, that a quality metric of the clock does not satisfy a threshold (block 820). For example, the first network device may determine, based on a clock signal of the second network device, that a quality metric of the clock does not satisfy a threshold, as described above.

As further shown in FIG. 8, process 800 may include providing, to the second network device, a clock fault notification to cause the second network device to downgrade the clock quality indication transmitted by the second network device (block 830). For example, the first network device may provide, to the second network device, a clock fault notification to cause the second network device to downgrade the clock quality indication transmitted by the second network device, as described above.

As further shown in FIG. 8, process 800 may include selecting a new reference clock for the first network device based on receiving the downgraded clock quality indication from the second network device (block 840). For example, the first network device may select a new reference clock for the first network device based on receiving the downgraded clock quality indication from the second network device, as described above.

Process 800 may include additional implementations, such as any single implementation or any combination of implementations described below and/or in connection with one or more other processes described elsewhere herein.

In a first implementation, the clock quality indication is received via an Ethernet communication layer of the network, and the clock signal is received via a physical communication layer of the network.

In a second implementation, alone or in combination with the first implementation, the new reference clock is associated with a third network device of the network that includes the first network device and the second network device, and the new reference clock is used to synchronize the first network device and the third network device.

In a third implementation, alone or in combination with one or more of the first and second implementations, the first network device is situated, within a topology of the network, downstream from the second network device and the third network device.

In a fourth implementation, alone or in combination with one or more of the first through third implementations, the clock quality indication that is associated with the clock of the second network device has a higher priority than a clock quality indication that is associated with the new reference clock.

In a fifth implementation, alone or in combination with one or more of the first through fourth implementations, providing the clock fault notification comprises: inserting a fault code within an unused field of a synchronization status message that is associated with a type of synchronization status message of the clock quality indication, the first network device and the second network device are configured to detect the fault code, and providing the synchronization status message as the clock fault notification.

In a sixth implementation, alone or in combination with one or more of the first through fifth implementations, the network comprises a synchronous Ethernet network, and the clock quality indication, the clock fault notification, and the new clock quality indication are synchronization status messages that are communicated via an Ethernet synchronization message channel of the synchronous Ethernet network.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
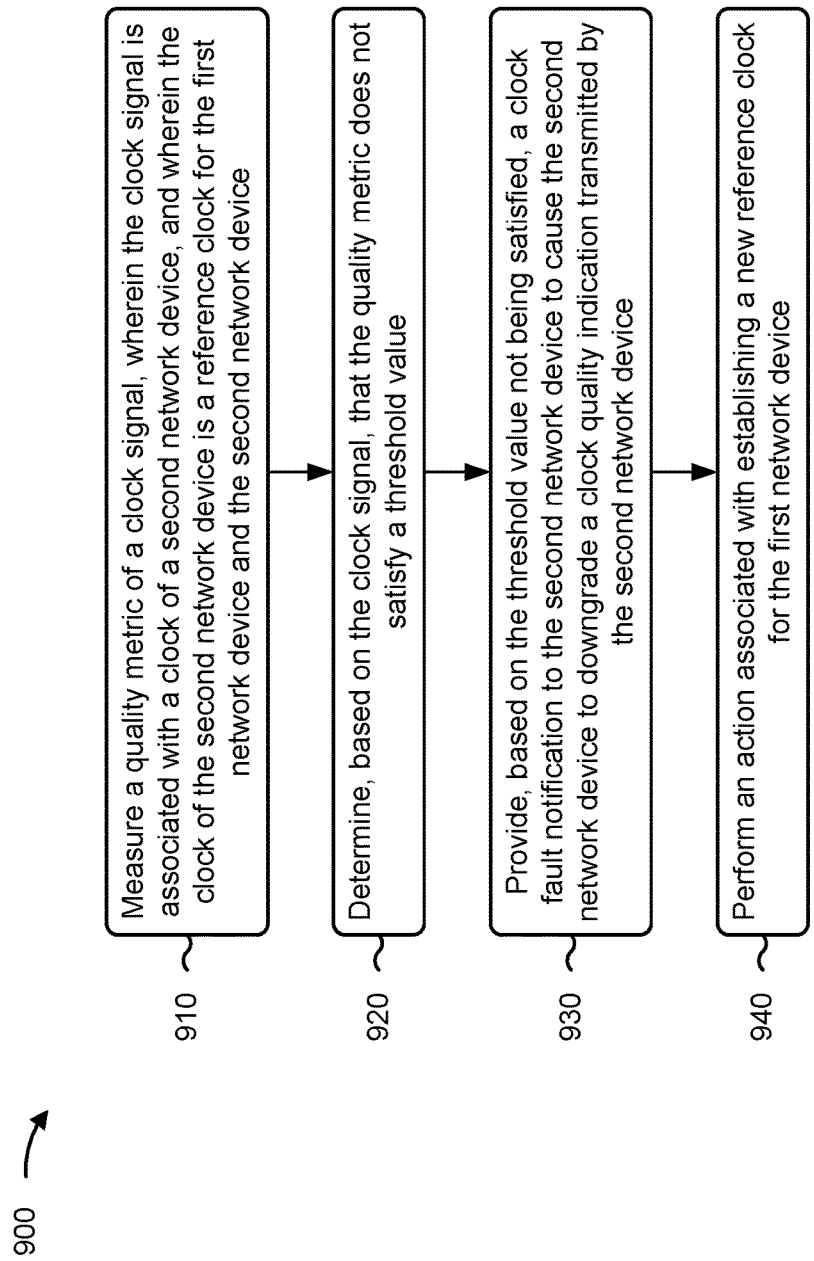

FIG. 9 is a flow chart of an example process 900 associated with clock fault detection and correction between synchronized network devices. In some implementations, one or more process blocks of FIG. 9 may be performed by a first network device (e.g., network device 510-1). In some implementations, one or more process blocks of FIG. 9 may be performed by another device or a group of devices separate from or including the first network device, such as one or more other network devices (e.g., network device 510-2, network device 510-N, and/or the like), and/or the like. Additionally, or alternatively, one or more process blocks of FIG. 9 may be performed by one or more components of a device 600 (e.g., processor 620, memory 630, storage component 640, input component 650, output component 660, communication interface 670, and/or the like), a device 700 (e.g., input component 710, switching component 720, output component 730, controller 740, and/or the like), and/or the like.

As shown in FIG. 9, process 900 may include measuring a quality metric of a clock signal, wherein the clock signal is associated with a clock of a second network device, and wherein the clock of the second network device is a reference clock for the first network device and the second network device (block 910). For example, the first network device may measure a quality metric of a clock signal, as described above. In some implementations, the clock signal is associated with a clock of a second network device. In some implementations, the clock of the second network device is a reference clock for the first network device and the second network device.

As further shown in FIG. 9, process 900 may include determining, based on the clock signal, that the quality metric does not satisfy a threshold value (block 920). For example, the first network device may determine, based on the clock signal, that the quality metric does not satisfy a threshold value, as described above.

As further shown in FIG. 9, process 900 may include providing, based on the threshold value not being satisfied, a clock fault notification to the second network device to cause the second network device to downgrade a clock quality indication transmitted by the second network device (block 930). For example, the first network device may provide, based on the threshold value not being satisfied, a clock fault notification to the second network device to cause the second network device to downgrade a clock quality indication transmitted by the second network device, as described above.

As further shown in FIG. 9, process 900 may include performing an action associated with establishing a new reference clock for the first network device (block 940). For example, the first network device may perform an action associated with establishing a new reference clock for the first network device, as described above.

Process 900 may include additional implementations, such as any single implementation or any combination of implementations described below and/or in connection with one or more other processes described elsewhere herein.

In a first implementation, the clock quality indication and the clock signal are received from the second network device.

In a second implementation, alone or in combination with the first implementation, the first network device and the second network device are routers of a synchronous Ethernet network.

In a third implementation, alone or in combination with one or more of the first and second implementations, the clock quality indication is received via an Ethernet communication layer of the network, and the clock signal is received via a physical communication layer of the network.

In a fourth implementation, alone or in combination with one or more of the first through third implementations, process 900 includes receiving, from the second network device, the downgraded clock quality indication, selecting the new reference clock based on a different clock quality indication associated with the new reference clock; and forward the second clock quality indication to one or more other network devices to is causing the one or more other network devices to use the new reference clock.

In a fifth implementation, alone or in combination with one or more of the first through fourth implementations, the new reference clock is associated with a third network device of the network, and the new reference clock is configured to synchronize the first network device, and the third network device.

In a sixth implementation, alone or in combination with one or more of the first through fifth implementations, process 900 includes insert a fault code within a field of a first type of synchronization status is messaging, wherein the clock quality indication is being associated with a second type of synchronization status message that is different from the first type, wherein the first network device and the second network device is being different types of network devices; and providing the synchronization status message as the clock fault notification.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
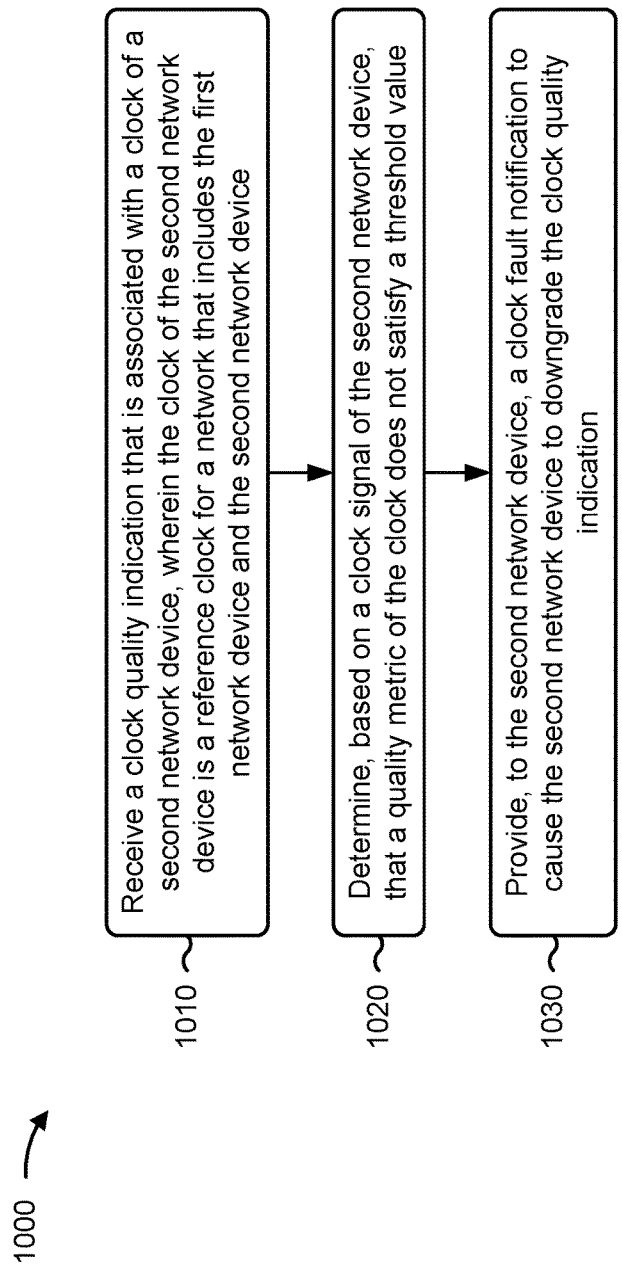

FIG. 10 is a flow chart of an example process 1000 associated with clock fault detection and correction between synchronized network devices. In some implementations, one or more process blocks of FIG. 10 may be performed by a first network device (e.g., network device 510-1). In some implementations, one or more process blocks of FIG. 10 may be performed by another device or a group of devices separate from or including the first network device, such as one or more other network devices (e.g., network device 510-2, network device 510-N, and/or the like), and/or the like. Additionally, or alternatively, one or more process blocks of FIG. 10 may be performed by one or more components of a device 600 (e.g., processor 620, memory 630, storage component 640, input component 650, output component 660, communication interface 670, and/or the like), a device 700 (e.g., input component 710, switching component 720, output component 730, controller 740, and/or the like), and/or the like.

As shown in FIG. 10, process 1000 may include receiving a clock quality indication that is associated with a clock of a second network device, wherein the clock of the second network device is a reference clock for a network that includes the first network device and the second network device (block 1010). For example, the first network device may receive a clock quality indication that is associated with a clock of a second network device, as described above. In some implementations, the clock of the second network device is a reference clock for a network that includes the first network device and the second network device.

As further shown in FIG. 10, process 1000 may include determining, based on a clock signal of the second network device, that a quality metric of the clock does not satisfy a threshold value (block 1020). For example, the first network device may determine, based on a clock signal of the second network device, that a quality metric of the clock does not satisfy a threshold value, as described above.

As further shown in FIG. 10, process 1000 may include providing, to the second network device, a clock fault notification to cause the second network device to downgrade the clock quality indication (block 1030). For example, the first network device may provide, to the second network device, a clock fault notification to cause the second network device to downgrade the clock quality indication, as described above.

Process 1000 may include additional implementations, such as any single implementation or any combination of implementations described below and/or in connection with one or more other processes described elsewhere herein.

In a first implementation, the clock quality indication is received via an Ethernet synchronization message channel of the network, and the clock signal is received via a physical communication layer of the network.

In a second implementation, alone or in combination with the first implementation, process 1000 includes analyzing, via a phase-locked loop of the first network device, the clock signal to determine the quality metric; comparing the quality metric with the threshold value; and determining that the quality metric does not satisfy the threshold value.

In a third implementation, alone or in combination with one or more of the first and second implementations, process 1000 includes selecting a new reference clock for the first network device; and providing, to one or more other network devices, a clock quality indication that is associated with the new reference clock.

In a fourth implementation, alone or in combination with one or more of the first through third implementations, the network is a synchronous Ethernet network.

In a fifth implementation, alone or in combination with one or more of the first through fourth implementations, process 1000 includes determining a configuration of the second network device; and providing, based on the configuration of the second network device, the clock fault notification as a fault code within one of: an unused field of a first type of synchronization status is messaging that is associated with the clock quality indication, or a field of a second type of synchronization status is messaging that is different from the first type of synchronization status message.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a first network device and from a second network device, a clock signal and a clock quality indication that is associated with a clock of the second network device,
wherein the clock of the second network device is a reference clock for a network that includes the first network device and the second network device;
determining, by the first network device and based on the clock signal from the second network device, that a quality metric of the clock signal does not satisfy a threshold,
wherein the quality metric indicates a quality level of the clock signal;
providing, by the first network device and to the second network device, a clock fault notification to cause the second network device to downgrade the clock quality indication from the second network device; and
selecting, by the first network device, a new reference clock for the first network device based on receiving the downgraded clock quality indication from the second network device.

2. The method of claim 1, wherein the clock quality indication is received via an Ethernet communication layer of the network, and
wherein the clock signal is received via a physical communication layer of the network.

3. The method of claim 1, wherein the new reference clock is associated with a third network device of the network that includes the first network device and the second network device, and
wherein the new reference clock is used to synchronize the first network device and the third network device.

4. The method of claim 3, wherein the first network device is situated, within a topology of the network, downstream from the second network device and the third network device.

5. The method of claim 1, wherein the clock quality indication that is associated with the clock of the second network device has a higher priority than a clock quality indication that is associated with the new reference clock.

6. The method of claim 1, wherein providing the clock fault notification comprises:
inserting a fault code within an unused field of a synchronization status message that is associated with a type of synchronization status message of the clock quality indication,
wherein the first network device and the second network device are configured to detect the fault code; and
providing the synchronization status message as the clock fault notification.

7. The method of claim 1, wherein the network comprises a synchronous Ethernet network, and
wherein the clock quality indication, the clock fault notification, and a new clock quality indication are synchronization status messages that are communicated via an Ethernet synchronization message channel of the synchronous Ethernet network.

8. A first network device, comprising:
one or more memories; and
one or more processors to:
measure a quality metric of a clock signal,
wherein the clock signal is associated with a clock of a second network device, and
wherein the clock of the second network device is a reference clock for the first network device and the second network device;

determine, based on the clock signal, that the quality metric does not satisfy a threshold
wherein the quality metric indicates a quality level of the clock signal;
provide, based on the threshold value not being satisfied, a clock fault notification to the second network device to cause the second network device to downgrade a clock quality indication transmitted by the second network device; and
perform an action associated with establishing a new reference clock for the first network device.

9. The first network device of claim 8, wherein the clock quality indication and the clock signal are received from the second network device.

10. The first network device of claim 8, wherein the first network device and the second network device are routers of a synchronous Ethernet network.

11. The first network device of claim 8, wherein the clock quality indication is received via an Ethernet communication layer of the network, and
wherein the clock signal is received via a physical communication layer of the network.

12. The first network device of claim 8, wherein the one or more processors are configured to:
receive, from the second network device, the downgraded clock quality indication,
select the new reference clock based on a different clock quality indication associated with the new reference clock; and
forward the second clock quality indication to one or more other network devices to cause the one or more other network devices to use the new reference clock.

13. The first network device of claim 12, wherein the new reference clock is associated with a third network device of the network, and
wherein the new reference clock is configured to synchronize the first network device, and the third network device.

14. The first network device of claim 8, wherein the one or more processors, when providing the clock fault notification, are configured to:
insert a fault code within a field of a first type of synchronization status message,
wherein the clock quality indication is associated with a second type of synchronization status message that is different from the first type,
wherein the first network device and the second network device are different types of network devices; and
provide the synchronization status message as the clock fault notification.

15. A system comprising:
a first network device configured to:
receive a clock signal and a clock quality indication that is associated with a clock of a second network device,
wherein the clock of the second network device is a reference clock for a network that includes the first network device and the second network device;
determine, based on the clock signal of the second network device, that a quality metric of the clock signal does not satisfy a threshold value,
wherein the quality metric indicates a quality level of the clock signal; and
provide, to the second network device, a clock fault notification to cause the second network device to downgrade the clock quality indication.

16. The system of claim 15, wherein the clock quality indication is received via an Ethernet synchronization message channel of the network, and
wherein the clock signal is received via a physical communication layer of the network.

17. The system of claim 15, wherein the first network device, when determining that the quality metric of the clock does not satisfy the threshold value, is further configured to:
analyze, via a phase-locked loop of the first network device, the clock signal to determine the quality metric;
compare the quality metric with the threshold value; and
determine that the quality metric does not satisfy the threshold value.

18. The system of claim 15, wherein the first network device is further configured to:
select a new reference clock for the first network device; and
provide, to one or more other network devices, a clock quality indication that is associated with the new reference clock.

19. The system of claim 15, wherein the network is a synchronous Ethernet network.

20. The system of claim 15, wherein the further network device, when providing the clock fault notification, is further configured to:
determine a configuration of the second network device; and
provide, based on the configuration of the second network device, the clock fault notification as a fault code within one of:
an unused field of a first type of synchronization status message that is associated with the clock quality indication, or
a field of a second type of synchronization status message that is different from the first type of synchronization status message.

* * * * *

UNITED STATES PATENT AND TRADEMARK OFFICE
CERTIFICATE OF CORRECTION

PATENT NO. : 11,411,666 B2
APPLICATION NO. : 16/918684
DATED : August 9, 2022
INVENTOR(S) : Kumar S et al.

It is certified that error appears in the above-identified patent and that said Letters Patent is hereby corrected as shown below:

In the Claims

Column 25, Line 2 change "metric does not satisfy a threshold" to -- metric does not satisfy a threshold value --

Signed and Sealed this
Twenty-second Day of November, 2022

Katherine Kelly Vidal
Director of the United States Patent and Trademark Office